US011030913B2

(12) United States Patent
Panuganty et al.

(10) Patent No.: US 11,030,913 B2
(45) Date of Patent: Jun. 8, 2021

(54) INTELLIGENT AND CONTEXTUAL SYSTEM FOR KNOWLEDGE PROGRESSION AND QUIZ MANAGEMENT

(71) Applicant: SelectQ Corporation, Fremont, CA (US)

(72) Inventors: Ramesh Panuganty, Fremont, CA (US); Swapna Panuganty, Fremont, CA (US)

(73) Assignee: Thinkster Learning, Inc., Kendall Park, NJ (US)

( * ) Notice: Subject to any disclaimer, the term of this patent is extended or adjusted under 35 U.S.C. 154(b) by 328 days.

(21) Appl. No.: 16/002,971

(22) Filed: Jun. 7, 2018

(65) Prior Publication Data
US 2019/0378429 A1 Dec. 12, 2019

(51) Int. Cl.
*G09B 7/04* (2006.01)
*G09B 7/077* (2006.01)
*G06K 9/00* (2006.01)
*G09B 5/06* (2006.01)
*G06F 16/9535* (2019.01)
*G06F 40/10* (2020.01)
*H04N 1/00* (2006.01)
*G06F 40/103* (2020.01)
*G09B 7/02* (2006.01)
*G06F 16/432* (2019.01)
*G06F 16/58* (2019.01)
(Continued)

(52) U.S. Cl.
CPC .......... *G09B 7/04* (2013.01); *G06F 16/434* (2019.01); *G06F 16/58* (2019.01); *G06F 16/5846* (2019.01); *G06F 16/5854* (2019.01);
*G06F 16/9535* (2019.01); *G06F 40/10* (2020.01); *G06F 40/103* (2020.01); *G06K 9/00442* (2013.01); *G06K 9/00469* (2013.01); *G06K 9/4604* (2013.01); *G09B 5/06* (2013.01); *G09B 7/02* (2013.01); *G09B 7/077* (2013.01); *H04N 1/00* (2013.01); *G06K 2209/01* (2013.01)

(58) Field of Classification Search
None
See application file for complete search history.

(56) References Cited

U.S. PATENT DOCUMENTS 9,292,739 B1\* 3/2016 Gray ................. G06K 9/033
2003/0017442 A1\* 1/2003 Tudor .................. G09B 7/04
434/322

(Continued)

FOREIGN PATENT DOCUMENTS

JP 2019-101149 \* 11/2017 ............... G09B 7/00

*Primary Examiner* — Jason T Yen
(74) *Attorney, Agent, or Firm* — FIG. 1 Patents

(57) ABSTRACT

Techniques described herein provide intelligent context-based testing. One or more implementations receive an image that includes content. In turn, some implementations process the image to extract test information from the content, such as questions, answers, learning material, and so forth. By analyzing the test information, various implementations determine one or more characteristics associated with the test information, and dynamically generate new test information based on the determined one or more characteristics. As one example, some implementations obtain new content by searching for content that includes the one or more characteristics and generate new test information based on the new content and the extracted test information.

20 Claims, 30 Drawing Sheets

(51) Int. Cl.
    *G06F 16/583* (2019.01)
    *G06K 9/46* (2006.01)

(56) References Cited

U.S. PATENT DOCUMENTS

| | | | |
|---|---|---|---|
| 2011/0045452 A1* | 2/2011 | Bejar | G09B 7/04 |
| | | | 434/362 |
| 2012/0310929 A1* | 12/2012 | Patterson | G06F 16/248 |
| | | | 707/728 |
| 2013/0305135 A1* | 11/2013 | Patterson | G06F 3/0483 |
| | | | 715/230 |
| 2014/0242567 A1* | 8/2014 | Lee | G09B 7/06 |
| | | | 434/362 |
| 2015/0125845 A1* | 5/2015 | Cho | G09B 7/02 |
| | | | 434/353 |
| 2017/0092146 A1* | 3/2017 | Shimada | H04N 1/00795 |
| 2017/0316710 A1* | 11/2017 | Ikenaga | G09B 7/08 |

* cited by examiner

```
<picture type> triangle
<angles> A, B, C
<sides> AB, BC, CA
<measurements> AB=13, BC=12, AC=5
```

ND CONTEXTUAL SYSTEM
INTELLIGENT AND CONTEXTUAL SYSTEM FOR KNOWLEDGE PROGRESSION AND QUIZ MANAGEMENT

BACKGROUND

Students oftentimes use various types of examinations to advance and track their knowledge level. For example, while studying a particular subject matter, a user can take corresponding quizzes as gradient steps towards an exam determine what information has been sufficiently learned and what information should be revisited. After completing the gradient quizzes, the student may then take a test and/or examination that spans the collective subject matter of the various quizzes. As another example, a student may take practice standardized tests to determine their comprehensive knowledge over multiple topics. Unfortunately, the questions used in these various types of examinations can often become obsolete and overwhelming for various reasons, such as by including generic, irrelevant and/or outdated material, the user out-growing subject matter included in the test, the student under-performing in the subject matter, and so forth. Thus, the static nature of these questions fails to provide customized testing based on the student's individual capacity. This can be further compounded when the posed questions lack additional information to help the user better understand the question and/or the corresponding subject matter. Thus, it is desirable to dynamically generate questions, test, and/or learning material based on various characteristics associated with who the information is being administered to.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
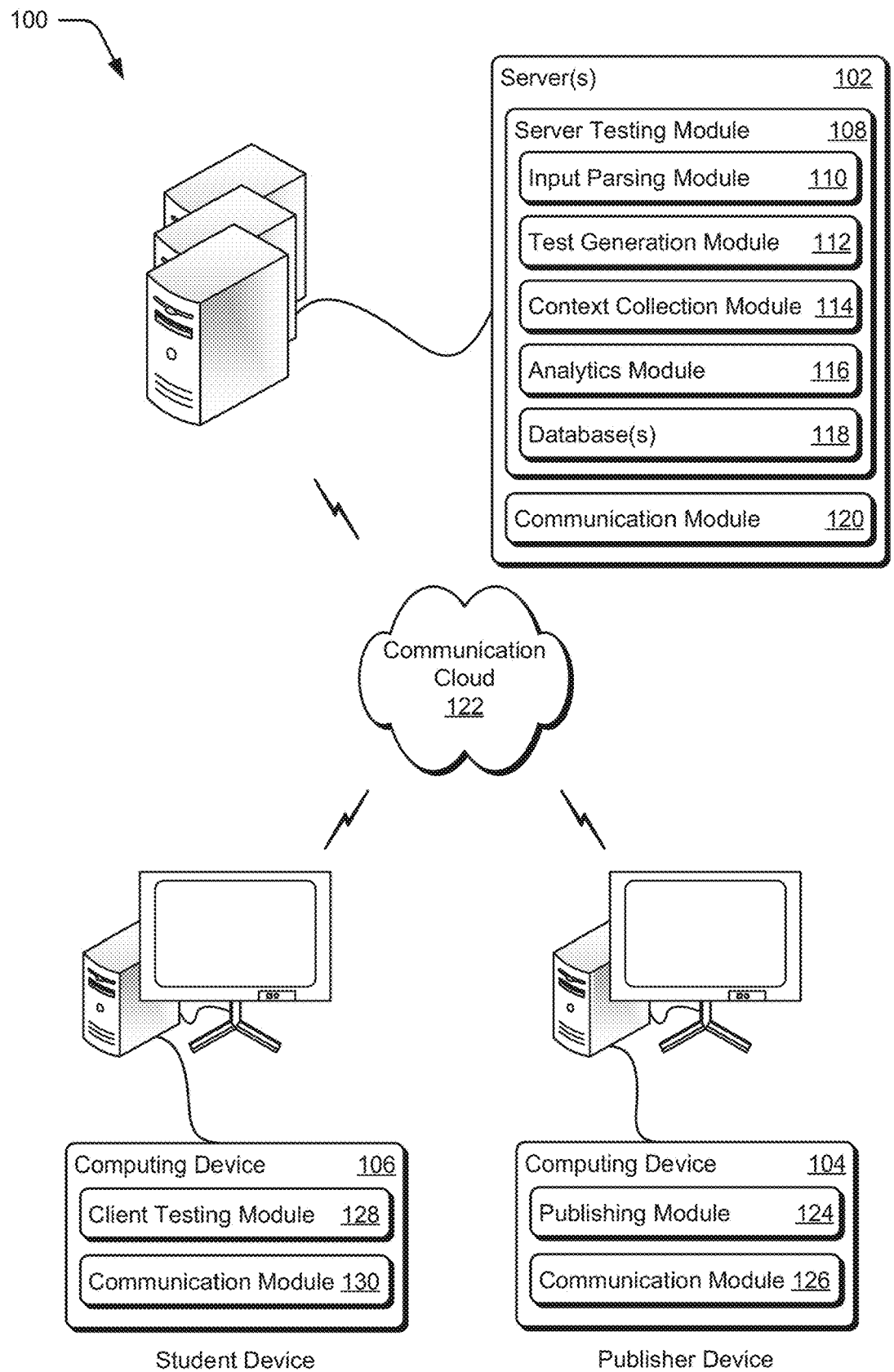
FIG. 1 is an overview of a representative environment of context-based testing in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide intelligent context-based testing. One or more implementations receive an image that includes content. In turn, some implementations process the image to extract test information from the content, such as questions, answers, learning material, and so forth. By analyzing the test information, various implementations determine one or more characteristics associated with the test information, and dynamically generate new test information based on the determined one or more characteristics. As one example, some implementations obtain new content by searching for content that includes the one or more characteristics and generate new test information based on the new content and the extracted test information.

One or more implementations administer test information to a student user, such as gradient quizzes, cumulative tests, standardized tests, and so forth. In administering the test to the student user, various implementations obtain context information associated with the student user, such as an assessed learning level, user preferences, and so forth. In turn, some implementations modify the test information based upon the context information, such as increasing the difficulty level associated with test questions, providing more or less learning material, etc. In response to modifying the test information, one or more implementations administer the modified test information to the student user.

Consider now an example environment in which various aspects as described herein can be employed.

Example Environment

FIG. 1 illustrates an example environment 100 that includes an example context-based testing system in accordance with one or more implementations. Environment 100 includes server(s) 102, computing device 104, and computing device 106 that, in concert, provide publishers users and/or student users with context-based testing features as further described herein. Context-based testing generally refers to intelligent and context-based learning that can dynamically update question content based upon context information, such as by basing test content on a particular user profile, on a group profile, on newly received subject matter, on performance tracking, and so forth. This can include generating new questions by identifying characteristics in existing questions and using the identified characteristics to form the new questions. The questions can be used in any suitable type of learning process, such as gradient and/or incremental quizzes, tests over groups of subject matters, and so forth. In various implementations, context-based testing alternately or additionally provides analytics and/or metrics on the testing process, such as group metrics, question metrics, rankings, etc. The phrase "publisher user" is used to denote users that provide input subject matter that is used to generate test information (e.g., test questions, test answers). Various implementations provide publisher users with the ability to selectively administer tests, such as what test information is published and/or accessible to student users. The phrase "student user" is used to denote users that access the test information provided by publisher users to adaptively learn the corresponding subject matter, such as by taking tests and/or quizzes. While the functionality provided by server(s) 102, computing device 104 and computing device 106 is illustrated in FIG. 1 as being implemented on separate devices, alternate or additional implementations integrate portions or all of the described functionality onto a single device. Here, computing device 104 corresponds to a publisher device which can be used by publisher users to input subject matter that is used to generate test information, while computing device 106 corresponds to a student device that administers tests and/or quizzes to student users.

Servers 102 represent a single server and/or multiple servers that receive testing subject matter from, and/or distribute context-based testing to, remote devices. Accordingly, servers 102 include server testing module 108 to provide server-side functionality associated with context-based testing. While the example implementation described with respect to environment 100 includes the use of servers, alternate or additional implementations provide the claimed functionality using stand-alone client applications as further described herein. In other words, the functionality described with respect to server testing module 108 can alternately or additionally reside on a user device. In some implementations, server testing module 108 receives input subject matter from a remote computing device, analyzes the input subject matter, and automatically extracts various types of test information to publish as testing information, such test questions, possible test answers, answer keys, and so forth. Input subject matter can be received in any suitable format, such as a text-based form, an image, audio, and so forth. Accordingly, server testing module 108 can include multiple different types of analysis algorithms that are used to identify and extract testing information. In FIG. 1, server testing module 108 includes input parsing module 110, test generation module 112, context collection module 114, analytics module 116, and databases 118.

Input parsing module 110 represents functionality that receives input subject matter and parses through the input subject matter to extract testing information. As one example, some implementations receive audible input, and convert the audible input into text using speech-to-text algorithms. In turn, the text is analyzed to identify various characteristics that can be used to identify questions and/or answers as further described herein. Alternately or additionally, some implementations receive images, and scan the images for test information content. For instance, the images can be converted into a text-based format by using Optical Character Recognition (OCR) algorithms and then analyzed to identify the test information. As yet another example, various implementations receive text-based input from a user. In turn, the input parsing module automatically identifies questions and answers included within the subject matter based upon the various identified characteristics of the text-based format and/or what subject the test information pertains to (e.g., math, language, history, engineering, law, etc.). In response to identifying the test information and/or the subject matter associated with the test information, some implementations store the newly identified test information in databases 118 as further described herein.

Test generation module 112 generates a group or series of questions for a test based on context information. For example, test generation module 112 can interface with context collection module 114 to determine a context associated with a particular student user's profile, a particular group of student users, and so forth, that a test is being generated for. In turn, test generation module can select the test information from databases 118 to provide a context-based test to the particular student user, particular group of student users, etc. This can include determining what learning level is associated with the intended student user, what level of explanation to include in the corresponding questions posed in the test, etc. In response to generating a group of questions, the test generation module can alternately or additionally generate a corresponding key and/or list of the answers to the included questions. In various implementations, test generation module 112 generates new questions by identifying various characteristics associated with existing questions and applying these characteristics to new subject matter as further described herein.

Context collection module 114 tracks and/or acquires information corresponding to user interactions with the context-based testing system. The acquired information can pertain to a particular student user, a group of student users, and/or the test information the student user(s) interact with.

In turn, the acquired information is used to derive various types of context information. For example, context collection module 114 can collect context information about a particular student user taking a particular test, such as how long the user took to complete the particular test, how many correct answers were given, how many incorrect answers were give, what level of knowledge the user has in a particular subject matter, and so forth. Alternately or additionally, the context information can identify which questions take longer to answer, which questions are answered quickly, whether a question is relevant to a particular subject matter and/or learning level, and so forth. This can include collecting context information across multiple student users and analyzing the collective context information to evaluate questions as further described herein. In one or more implementations, the context collection module employs various machine-learning algorithms as a way to learn and generate characteristics associated with a student user, a group of student users, and so forth. Alternately or additionally, the machine-learning algorithms can be used to probabilistically determine expected user interactions. Generally, the phrase "machine-learning algorithm" is used to denote algorithms that apply statistical analysis to learn and/or progressively improve a particular task, such as identifying content characteristics, generating dynamic content, and so forth.

Analytics module 116 provides various metrics and/or analysis results associated with the context-based testing process. For example, some implementations of analytics module 116 identify various student users that have a same and/or similar learning level and provide rankings of the student users based on test results. This can include identifying when a student user has outgrown a current learning level, and subsequently regrouping the student user into a new group that has a different learning level as further described herein. Analytics module 116 can also analyze student user responses and determine when a particular response is a random answer and/or the student user has guessed. This can include using various machine-learning algorithms as a way to probabilistically and/or statistically identify the random answers and/or characterize a particular student user's (and/or group) behavior, characteristics, and so forth.

Databases 118 provides servers 102 with the ability to store and retrieve various types of test information. For example, upon identifying and/or generating a question from input subject matter, input parsing module 110 can store the question in databases 118. As another example, test generation module 112 can access databases 118 to gather various questions for a test. To enable the test generation module 112 access to different learning levels of questions in various subject matter, one or more implementations store and/or group test information using various characteristics, such as topic, sub-topics, learning level, etc. To facilitate module inter-operability, various implementations define a data structure according to a set of rules that, when followed, provide a mechanism for cross-entity and/or cross-module data sharing. For example, the set of rules can outline what type of information the data included in the data structure describes, an amount of data stored within the data structure, a format in which the data is stored within the data structure, and so forth. By following these rules, a first entity and/or module can create and store a data structure such that a second entity and/or module can successfully access and interpret the data included in the data structure. Accordingly, databases 118 can employ one or more data structures to facilitate test information inter-operability between modules.

Servers 102 also include communication module 120 that generally represents any suitable combination of hardware, software, and/or firmware used to facilitate the exchange of information with one or more other devices, such as images, addresses, audio, video, commands, queries, messaging, testing information, and so forth. Some implementations of communication module 120 include one or more protocol stacks associated with a network over which data is exchanged, firmware that drives hardware to generate signals and/or process messages used in maintaining a wireless and/or wired communication session, and so forth. Alternately or additionally, some implementations of communication module 120 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. This can include physical communication ports, such as a serial port, a parallel port, a Universal Serial Bus (USB) port, a keyboard port, a display port, an audio port, etc. In various implementations, servers 102 uses communication module 120 to connect with other devices over communication cloud 122, such as computing device 104 and/or computing device 106.

Communication cloud 122 generally represents any suitable type of communication network that facilitates a bi-directional link between various computing devices. Accordingly, communication cloud 122 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an IoT network, and so forth. In this example, communication cloud 122 connects servers 102 with computing device 104, computing device 106 and/or other devices not illustrated here.

Computing device 104 and computing device 106 are publisher and student user devices that include at least some context-based testing functionality. While illustrated here as separate devices, alternate or additional implementations combine the functionality provided by computing device 104 and computing device 106 into a single computing device. In various implementations, computing device 104 and/or computing device 106 access cloud-based services provide by servers 102 administer various features of context-based testing as further described herein. Alternately or additionally, computing device 104 and/or computing device 106 administer the various context-based testing features as a stand-alone application (e.g., without accessing servers 102). In environment 100, computing device 104 includes publishing capabilities while computing device 106 includes test administration capabilities. Accordingly, computing device 104 includes publishing module 124 and communication module 126, while computing device 106 includes client testing module 128 and communication module 130.

Publishing module 124 provides a mechanism to publish and/or add new subject matter to a testing database. In one or more implementations, publishing module 124 provides an interface into server testing module 108. For instance, publishing module 124 can accept input subject matter at computing device 104 in any suitable format (e.g., scanned images, audible input, text-based input, etc.), and forward the input subject matter to server testing module for further processing to identify testing information. Alternately or additionally, publishing module 124 analyzes the input subject matter to identify testing information and forwards the testing information to servers 102. Accordingly, various implementations of publishing module 124 interface with communication module 126 to establish a connection and/or exchange data with servers 102 over communication cloud 122. Similar to communication module 120, communication module 126 generally represents any suitable combination of hardware, software, and/or firmware to enable data exchanges with other devices.

Client testing module 128 generally provides client-side functionality associated with context-based testing. In various implementations, client testing module 128 collaborates with server testing module 108 to administer tests to a student user. As one example, client testing module 128 forwards a corresponding user profile to server testing module 108 as a way to obtain tests and/or questions based on that particular student user. Alternately or additionally, client testing module 128 tracks user interactions with a test and forwards the tracking information to servers 102 for use by context collection module 114. Accordingly, various implementations of client testing module 128 interface with communication module 130 to establish a connection and/or exchange data with servers 102 over communication cloud 122. Similar to communication module 120 and/or communication module 126, communication module 130 generally represents any suitable combination of hardware, software, and/or firmware to enable data exchanges with other devices. While client testing module 128 and publishing module 124 are each illustrated separately from server testing module 108, alternate or additionally implementations integrate their respective functionalities into a single module and/or on a single device.

Figure 2:
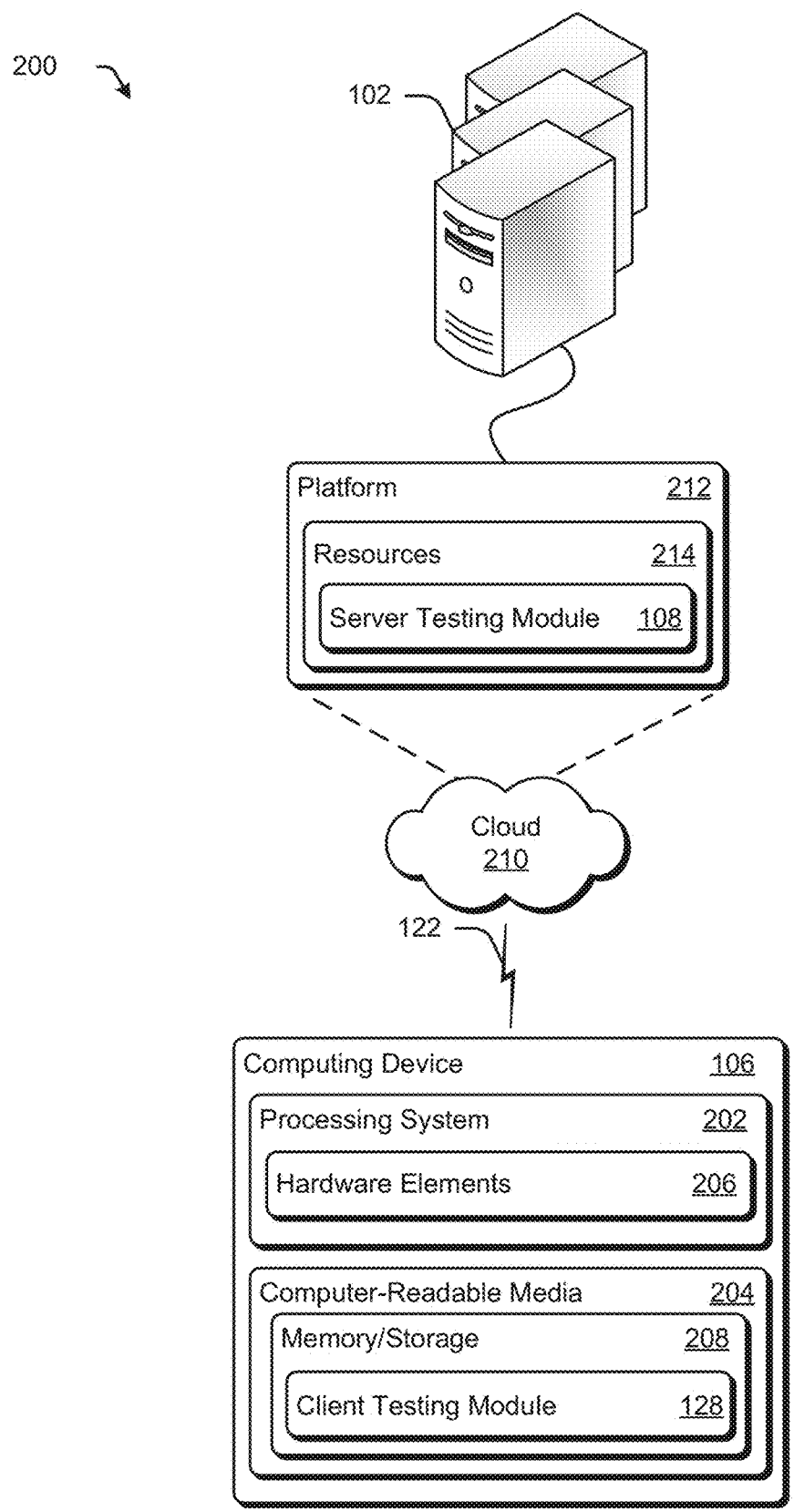
FIG. 2 illustrates an example environment in which cloud-based services can be used to provide context-based testing features in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes servers 102, computing device 106, and communication cloud 122 of FIG. 1, where computing device 106 includes a processing system 202, and one or more computer-readable media 204. While not illustrated here, environment 200 can alternately or additionally include computing device 104 of FIG. 1 in a similar manner as that described with respect to computing device 106. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random-access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, client testing module 128 of FIG. 1 is illustrated as residing within memory/storage 208, but alternate or additional implementations can implement client testing module 128 using combinations of firmware, hardware, and/or software without departing from the scope of the claimed subject matter, such as hardware elements 206. This can alternately or additionally be applied to publishing module 124 of FIG. 1 as well.

Example environment 200 enables multiple devices to be interconnected through servers 102, where servers 102 can be local to the multiple devices or remote from the multiple devices. In one or more implementations, servers 102 are configured as a cloud of one or more server computers that are connected to the multiple devices through a network, the Internet, or other data communication link. This interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

The cloud 210 includes and/or is representative of a platform 212 for resources 214. The platform 212 abstracts underlying functionality of hardware (e.g., servers) and software resources of the cloud 210. Resources 214 may include applications and/or data that can be utilized while computer processing is executed on servers that are remote from the computing device 106. For example, resources 214 can include server testing module 108.

The platform 212 may abstract resources and functions to connect computing device 106 with other computing devices. The platform 212 may also serve to abstract scaling of resources to provide a corresponding level of scale to encountered demand for the resources 214 that are implemented via the platform 212. Accordingly, in an interconnected device embodiment, implementation of functionality described herein may be distributed throughout the system. For example, the functionality may be implemented in part on the computing device 106 as well as via the platform 212 that abstracts the functionality of the cloud 210.

Having described example operating environments in which various aspects of context-based testing can be utilized, consider now a discussion of parsing input subject matter accordance with one or more implementations.

Parsing Input Static Content

Test administrators oftentimes have challenges adapting tests to the changing needs of students taking the tests. Consider an example in which a test administrator has a first class with above average test taking skills. In an effort to challenge the first class, the test administrator generates a test that has questions with a difficulty level targeted to students with an above average learning level. However, it is not uncommon for the test administrator to reuse portions or all of the test for subsequent classes. This can pose problems when the subsequent class on average has a different learning level relative to the first class. For instance, administering the same test to a second class that has an average learning level that is below the first class can result in frustration, lower test scores, and a general lack of understanding. Thus, it is desirable to have a way to dynamically adapt tests as well as learning content in a customize manner. Adding new subject matter to a test can further compound the issue, since the matter is untested and the administrator may not tailor the questions to the proper learning level of an intended recipient.

Techniques described herein provide intelligent context-based testing. One or more implementations receive an image that includes content and then process the image to extract test information from the content, such as questions, answers, learning material, and so forth. As further described herein, various implementations classify and/or sort the test information based upon various identified characteristics.

Figure 3:
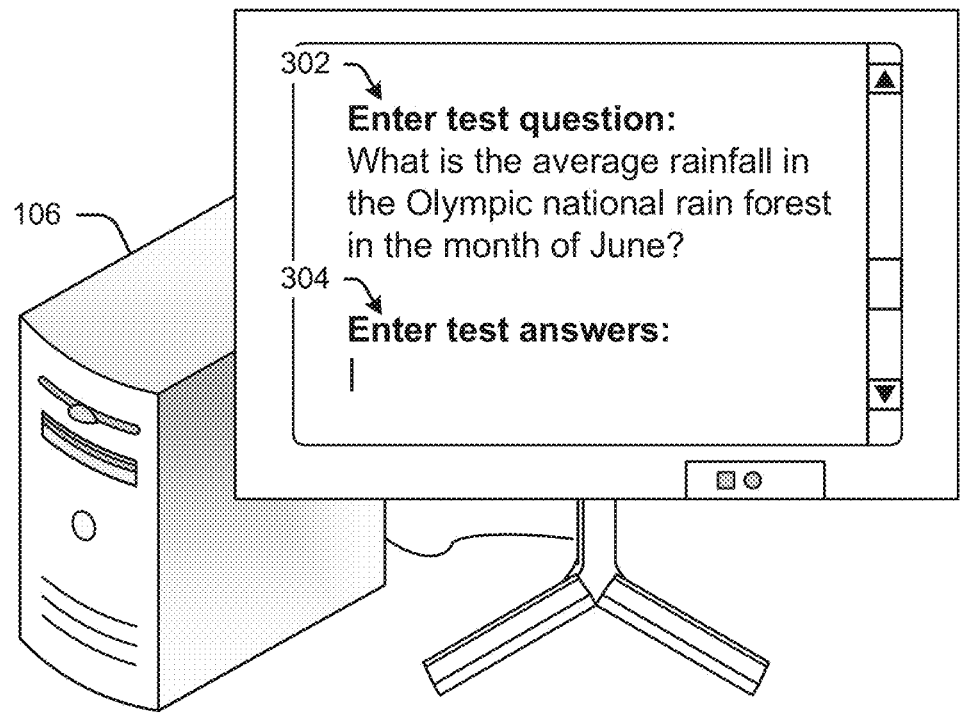
FIG. 3 illustrates an example of manually entering input subject matter in accordance with one or more implementations.
Figure 3:
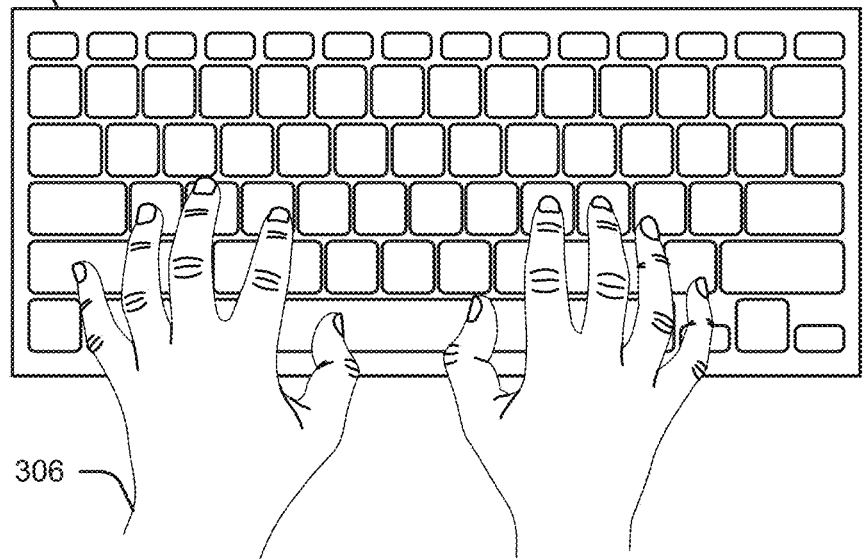

FIG. 3 illustrates an example environment 300 that can be used to input subject matter to use to generate test information in accordance with one or more implementations. Environment 300 includes computing device 106 of FIG. 1, where client testing module 128 (not illustrated here) displays various prompts that can be used to enter test questions and/or test answers. Here, prompt 302 cues a publisher user for an input corresponding to a test question, while prompt 304 cues the publisher user for an associated answer to the test question. Accordingly, publisher user 306 manually enters the test question and associated test answer via keyboard 308. While this mechanism provides the publisher user with the ability to add new questions and subject matter to a bank of questions, the manual nature of this entry mechanism can be slow and cumbersome. This can also create extra work for the publisher user by first creating a document that summaries the input subject matter and/or a test strategy and then manually entering the content from the document as test information.

Figure 4:
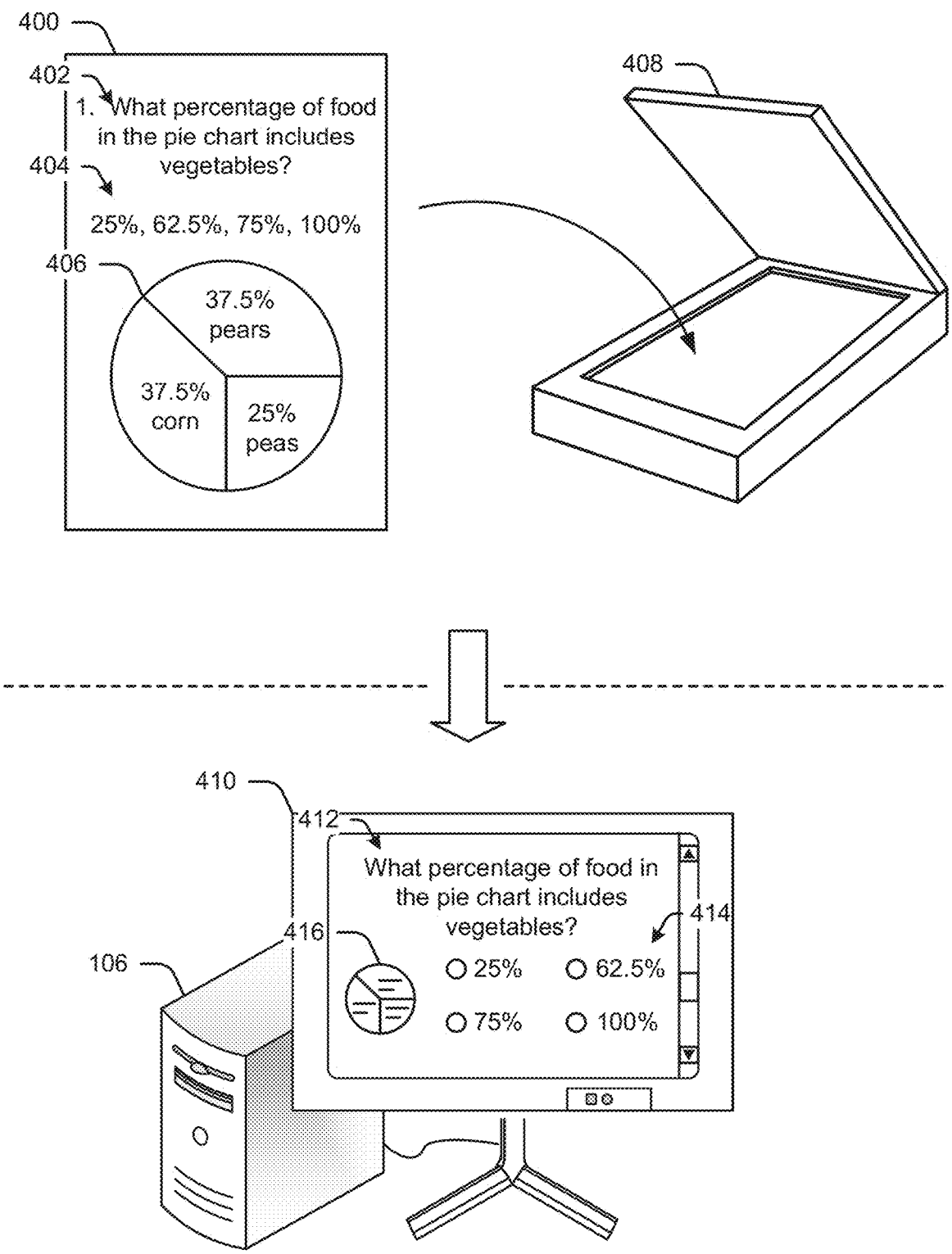
FIG. 4 illustrates an example of identifying test information from an image in accordance with one or more implementations.

Various implementations extract test information from image scans in accordance with one or more implementations. To further demonstrate, consider now FIG. 4 that illustrates an example of parsing input subject matter in accordance with one or more implementations. In various scenarios, the example described with respect to FIG. 4 can be considered a continuation of one or more examples described with respect to FIGS. 1-3. FIG. 4 illustrates an example progression of events over an arbitrary time period. Here, the progression begins in the upper portion of FIG. 4 and then moves to the lower portion of FIG. 4. It is to be appreciated that the progression of events described with respect to FIG. 4 is for discussion purposes, and that any other ordering, omission, and/or addition to the events can occur without departing from the scope of the claimed subject matter.

The upper portion of FIG. 4 includes document 400 that represents a collection of content that can be used to generate test information. In this example, document 400 includes a question 402, multiple answers 404, and pie chart 406. To enter the content of document 400 into the context-based testing system, various implementations use a scanner 408 to generate a digital image of document 400. In turn, the context-based testing system analyzes the digital image to extract testing information (e.g., questions, multiple choice answers, correct answer, etc.). For example, various implementations communicatively couple scanner 408 to computing device 104 of FIG. 1 (not illustrated here) such that a corresponding publishing module receives and forwards the scanned image to servers 102 for analysis. Alternately or additionally, computing device 104 performs the analysis locally. Various implementations apply an OCR algorithm to the digital image to generate a text-based format of the corresponding content that is then analyzed to identify various types of characteristics, such as serial numbers, indentation blocks, additional spacing between text groups, natural language patterns, and so forth. These characteristics can then be used to extract test information from the content.

To demonstrate, consider document 400 in which question 402 begins with the numeric identifier "1." In response to generating a text-based format of document 400, various implementations identify the numeric identifier "1" characteristic within the content and determine that a question exists after the numeric identifier. In response to identifying the question, various implementations alternately or additionally analyze the spacing between the identified question and subsequent text to identify an answer and/or possible answer choices. Here, the subsequent text following the identified question corresponds to answers 404. Additional analysis also determines that there are four distinct answer choices by identifying the commas separating each choice. While this example illustrates identifying questions and answers using pre-appended alphanumeric characters and spacings, other identification techniques can be utilized as well.

Document 400 also includes pie chart 406. In various implementations, images, charts, graphs and so forth can be included in any identified test information such that the images are published and/or presented with the corresponding questions and/or answers. For example, an analysis of the text-based format of question 402 can result in the identification of the phrase "pie chart". In various implementations, this identification prompts the context-based testing system to include pie chart 406 as part of the test information. Thus, some implementations can identify supplementary test information and/or images from the content of an identified question.

In response to identifying test information from a digital image, the test information is published and/or stored in an associated database. Here, publishing the test information refers to the action extracting and making test information available for testing purposes within the context-based testing system. This is further illustrated in the lower portion of FIG. 4, where computing device 106 of FIG. 1 drives display 410 with test information published from document 400. For example, display 410 includes published test question 412, published answer choices 414, and published pie chart 416. While the example described with respect to FIG. 4 illustrates a single document including a single question, it is to be appreciated that this is merely for discussion purposes, and that a document can include any suitable number of images, questions and answers without departing from the scope of the claimed subject matter.

Figure 5A:
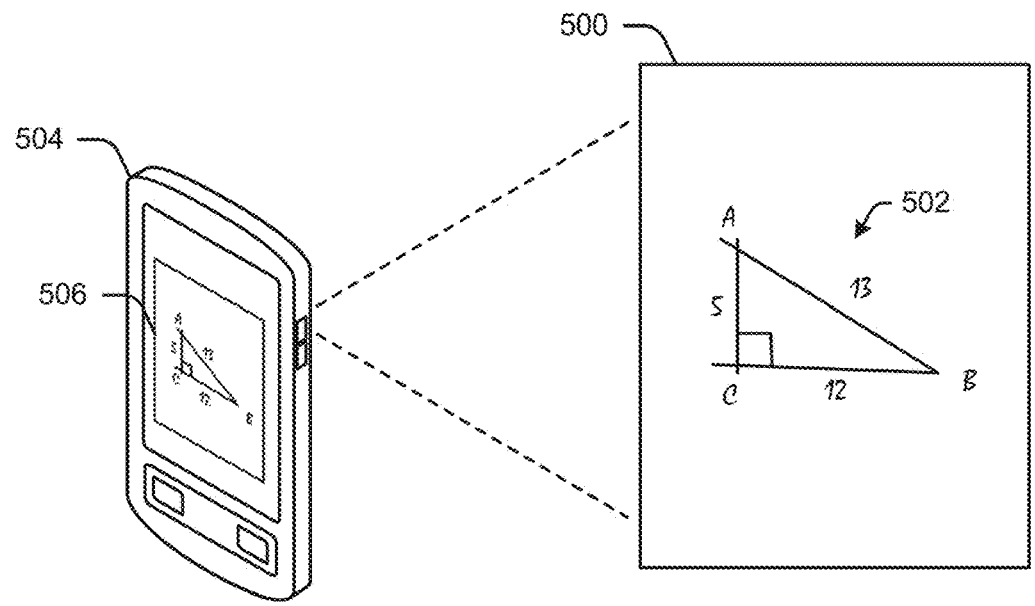
FIGS. 5a and 5b illustrates an example of generating text-based descriptions of graphics included in an image in accordance with one or more implementations.
Figure 5A:
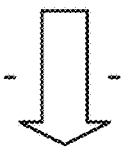
Figure 5B:
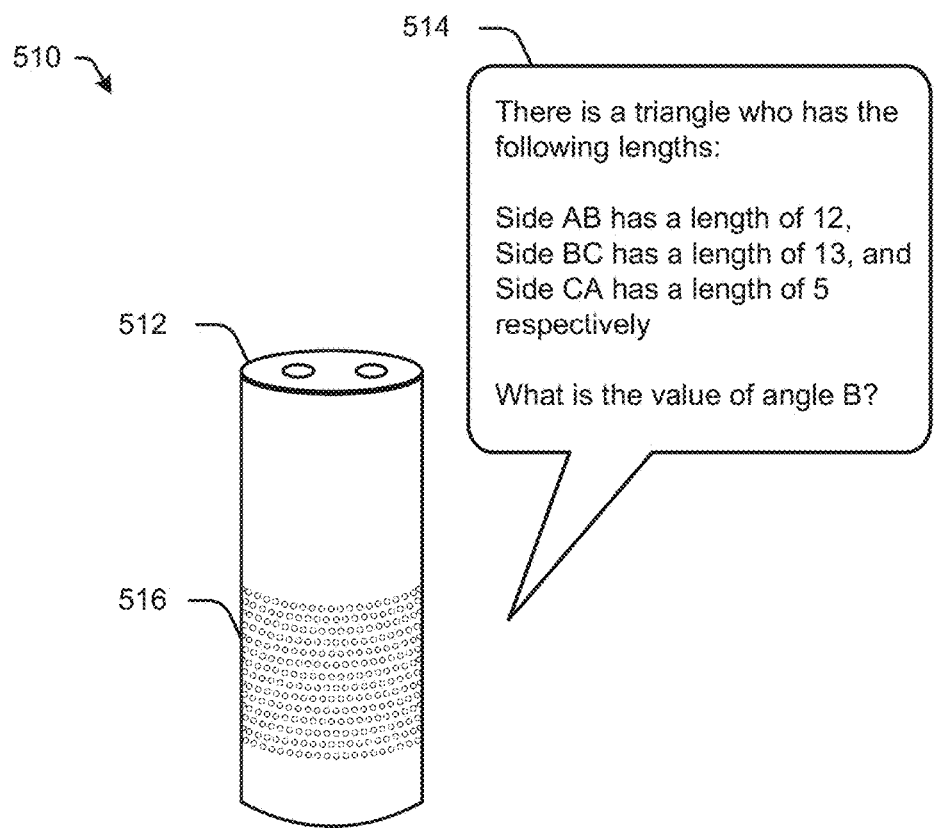
Figure 5B:
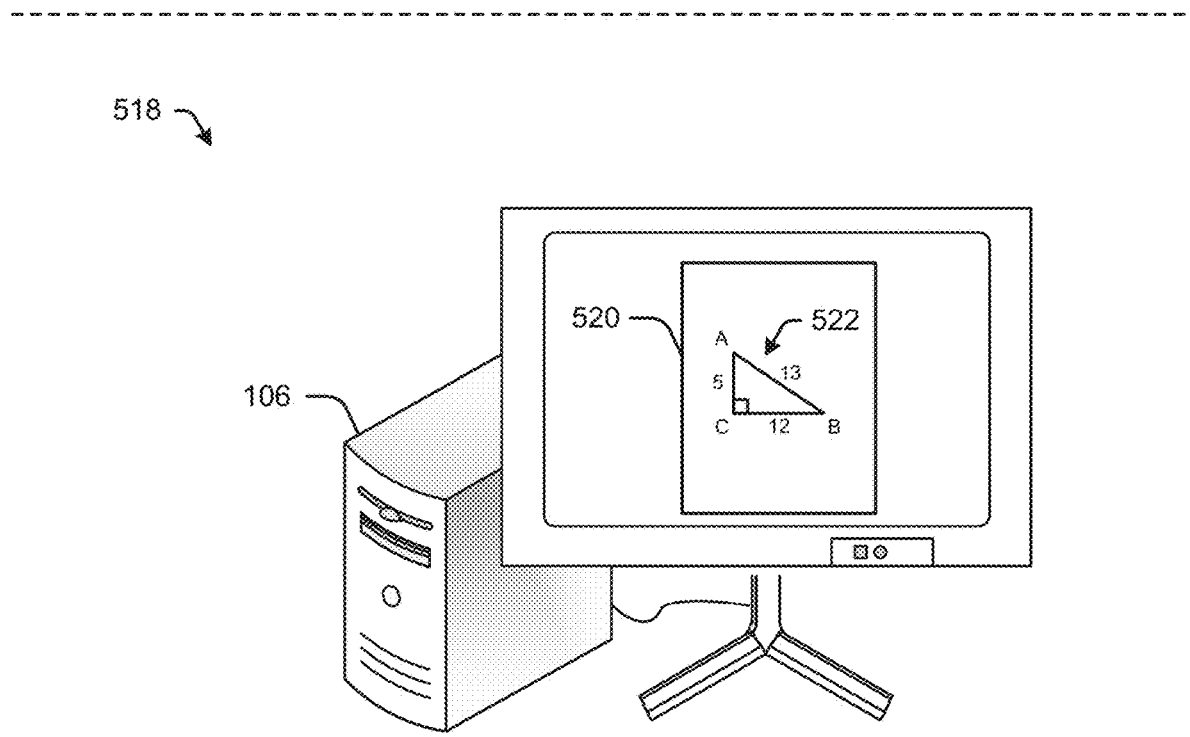

While FIG. 4 illustrates an example in which a pie chart image is included as part of the published test information, various implementations alternately or additionally generate text-based descriptions of images. To demonstrate, consider now FIGS. 5a and 5b that illustrate an example of including image descriptions in published test information in accordance with one or implementations. In various scenarios, the example described with respect to FIGS. 5a and 5b can be considered a continuation of one or more examples described with respect to FIGS. 1-4. FIGS. 5a and 5b collectively illustrate an example progression of events over an arbitrary time period. Here, the progression begins in the upper portion of FIG. 5a, followed by the lower portion of FIG. 5a. The progression then proceeds to FIG. 5b, where FIG. 5b includes two separate environments that generate questions based on text-based descriptions in accordance with one or more implementations. It is to be appreciated that the progression of events described with respect to FIGS. 5a and 5b is for discussion purposes, and that any other ordering, omission, and/or addition to the events can occur without departing from the scope of the claimed subject matter.

The upper portion of FIG. 5a includes document 500 with content 502 that generally corresponds to a graphic component. More particularly, content 502 includes a right triangle with identifying labels and side lengths. Here, the content has been entered in a freehand format such that the right triangle, labels, and side lengths are drawn using freehand rather than machine-generated shapes and/or text. Each angle of the right triangle has been labeled as A, B, and C respectively. Similarly, and using this same naming convention, each side has a given length, where side AB has a length of 13, side BC has a length of 12, and side CA has a length of 5. While the graphic component of content 502 is illustrated here as a right triangle with labels and side lengths, other types of graphic components can be utilized without departing from the scope of the claimed subject matter. The upper portion of FIG. 5a also includes mobile phone 504 that includes a camera for capturing images. Accordingly, to enter the content of document 500 into the context-based testing system, mobile phone 504 captures image 506. In some embodiments, mobile phone 504 forwards image 506 a server for processing and/or to enter content 502 into the context-based testing system. Alternately or additionally, mobile phone 504 processes image 506 and enters content 502 into the context-based testing system. Various implementations generate text-based descriptions of graphical components when processing content from an image.

To further demonstrate, consider now the lower portion of FIG. 5a that includes text description 508 that includes text-based description that corresponds to content 502. For example, text description 508 includes text description of the picture type, angle labels, side labels, and side lengths. In various implementations, OCR algorithms identify and/or extract these descriptions, which are then stored in a text-based format, such as the format illustrated in text description 508. However, any format can be utilized to store the text-based description, such as eXtensible Markup Language (XML), Scalable Vector Graphics (SVG), Speech Synthesis Markup Language (SSML), etc. Further, while the graphic associated with content 502 and the corresponding text description pertains to a triangle, other types of graphics can be process and converted into a text-based description, such as data tables, plotted charts, mathematical equations, sinusoidal curves, arcs, geometric shapes, and so forth. One advantage to a text-based conversion of an image and/or graphics included in the image is the ability to output the description in an audible form. Another advantage is the ability to clean up a graphic included in an image using the text-based description, such as by redrawing the image using the text-based description rather than rendering the graphic included in the image.

To demonstrate, the upper portion of FIG. 5b illustrates an environment 510 that includes a home assistant device 512 that is representative of computing device 106 of FIG. 1. Here, home assistant device 512 audibly administers test information based on content 502 included in document 500 and/or text description 508. More particularly, home assistant device 512 outputs audio 514 via speaker 516 where the audio includes an audible description of content 502 and/or a question generated from content 502. In some implementations, the home assistant device converts text-based information into an audible output using a text-to-speech algorithm. While not illustrated here, the home assistant device can alternately or additionally receive audible answers via a microphone and convert the audio into text using speech-to-text algorithms. This audible form of testing can be advantageous for student users who are visually impaired and unable to clearly see or comprehend rendered content.

The lower portion of FIG. 5b illustrates an environment 518 that includes computing device 106 of FIG. 1. Here, computing device 106 displays test information 520 that is based off of content 502. However, instead of using the freehand format image, computing device 106 regenerates portions or all of content 502 to generate a cleaner image. Various implementations analyze the text-based description, such as text description 508, to identify what content to render. For example, content 522 includes a machine-generated triangle shape and machine-generated labels based off of the text descriptions "<picture type> triangle", "<angles> A, B, C", and so forth. Thus, some implementations can generate sharper and/or cleaner images than the input source image using the text-based descriptions of the image.

FIG. 4 illustrates an example of automatically identifying answers and questions from an image scan based upon various characteristics identified within the image, while FIGS. 5a and 5b demonstrate an example of converting an image into text-based descriptions. However, other types of input subject matter can be extracted from digital images as well. To further demonstrate, now consider FIG. 6 that illustrates an example of identifying mathematical equations from scanned images in accordance with one or more implementations. In various scenarios, the example described with respect to FIG. 6 can be considered a continuation of one or more examples described with respect to FIGS. 1-5b.

Figure 6:
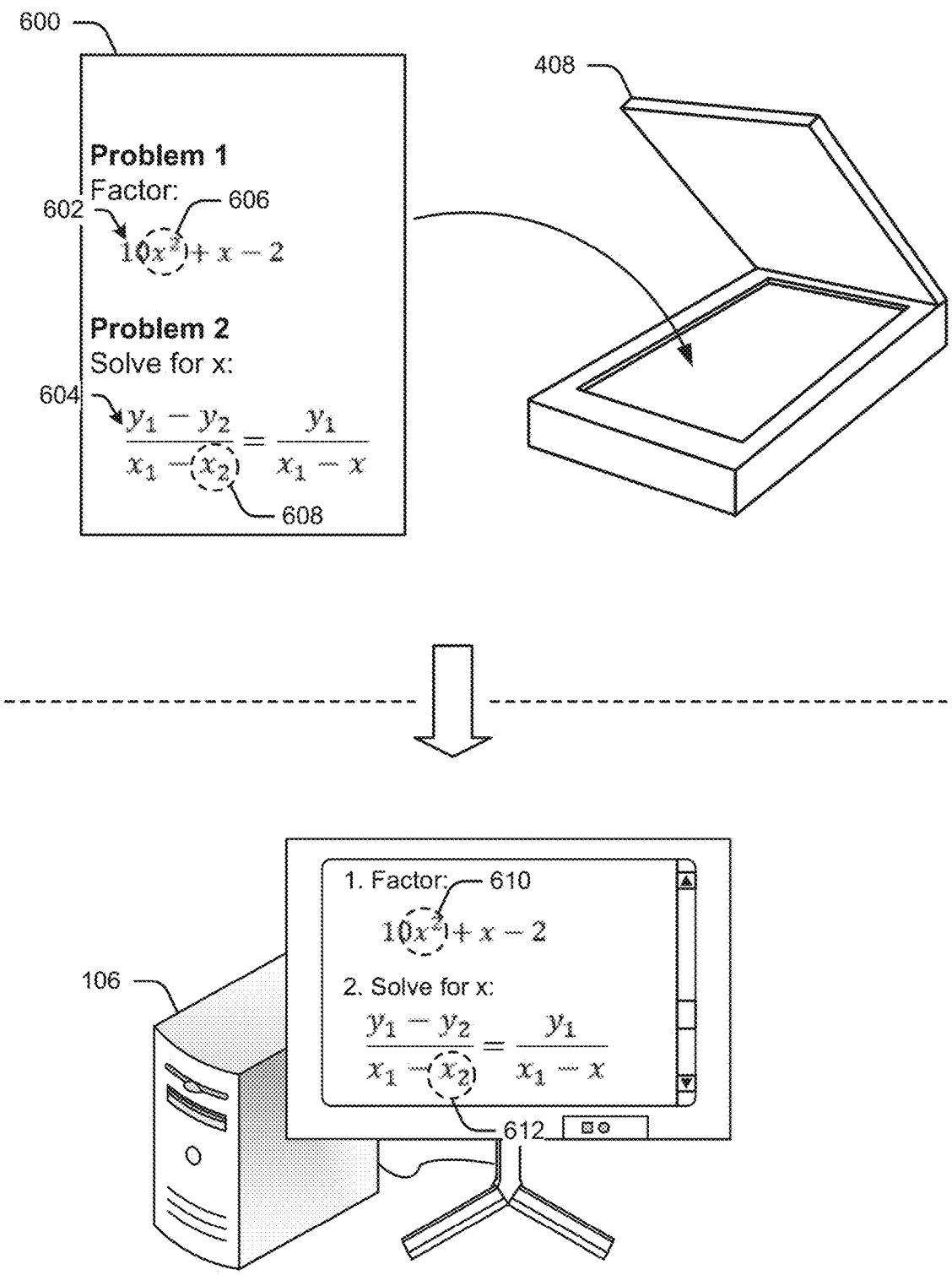
FIG. 6 illustrates an example of identifying mathematical equations from an image scan in accordance with one or more implementations.

FIG. 6 illustrates an example progression of events over an arbitrary time period. Here, the progression begins in the upper portion of FIG. 6 and then moves to the lower portion of FIG. 6. It is to be appreciated that the progression of events described with respect to FIG. 6 is for discussion purposes, and that any other ordering, omission, and/or addition to the events can occur without departing from the scope of the claimed subject matter.

Similar to that described with respect to FIG. 4, the upper portion of FIG. 6 includes scanner 408 which can be communicatively coupled to a computing device (not illustrated here) such that digital images generated by scanner 408 are entered into the context-based testing system. The upper portion of FIG. 6 also includes document 600 that includes two mathematical equations: mathematical equation 602 that corresponds to Problem 1, and mathematical equation 604 that corresponds to Problem 2. Recall from other discussions provided herein that various algorithms can be applied to the digital image to generate text-based descriptions, such as through the use of OCR algorithms. Since the document 600 includes mathematical equations, the conversion from an image to a text-based description can cause the generated information to be ambiguous and/or cryptic. As an example, mathematical equation 602 includes variable 606 in the form of "$x^2$", where the power factor is indicated using a superscript number. Some conversion algorithms remove superscript notations from the generated text-based description such that "$x^2$" becomes "x2". Conversely, mathematical equation 604 includes variable 608 that has a subscript identifier to denote a particular instance of the associated variable. Again, when conversion algorithms remove the subscript notations from the generated text-based description, "$x_2$" becomes "x2". Thus, for some implementations, the generated text-based description for document 600 can include multiple instances of "x2". However, each instance has a different connotation, thus causing ambiguity.

Various implementations resolve the ambiguity generated in the text-based descriptions by analyzing the resultant format to scan for context information that provides an indication of whether the ambiguity can be properly resolved as a subscript or superscript. For example, with respect to variable 608 and/or mathematical equation 604, the text-based description can be analyzed to identify whether there are multiple references to a same character and/or variable within the corresponding equation. Here, mathematical equation 604 includes multiple "x" characters that, when converted, can be viewed as "x1", "x2", etc. The analysis identifies the multiple instances of the same variable and that there are sequential characters appended to the multiple instances (e.g., "1" and "2"). This contexts information prompts the context-based testing system to determine that the appended alphanumeric character are subscripts. In turn, the generated test information associated with mathematical equation 604 format the characters accordingly (e.g., $x_1$, $x_2$).

As another example, mathematical equation 602 includes multiple instances of a same character/variable that, when converted, are viewed as "x2" and "x". In this example, given the lack of appended sequential characters, various implementations determine to convert the ambiguous character of variable 606 as a superscript (e.g., $x^2$). In other words, the context-based testing system can analyze the characters to find if there is a "X1" and an "X2" included in the characters. If no "X1" exists in the equation, it statistically increases the probability that the corresponding "X2" pertains to a superscript. Conversely, if an "X1" exists in an equation that includes an "X2", the statistics indicate the appended numbers correspond to subscripts. Thus, upon resolving the ambiguous characters, the resolved test information is stored as published test information.

Moving to the lower portion of FIG. 6, computing device 106 of FIG. 1 renders published test information based upon the document 600. As can be seen, the published test information includes variable 610 with a superscript format that indicates power information, and variable 612 with a subscript format that indicates instance information. While the example described with respect to FIG. 6 renders mathematical equations based on the digital document, alternate or additional implementation scan generate text-based descriptions of the mathematical equations, such as those described with respect to pie chart 406 of FIG. 5.

In response to extracting test information from a digital image, various implementations categorize test information into topics, sub-topics, and so forth. To further demonstrate, consider now FIG. 7 that illustrates of test information categorization in accordance with one or more implementations. In various scenarios, the example described with respect to FIG. 7 can be considered a continuation of one or more examples described with respect to FIGS. 1-6.

Figure 7:
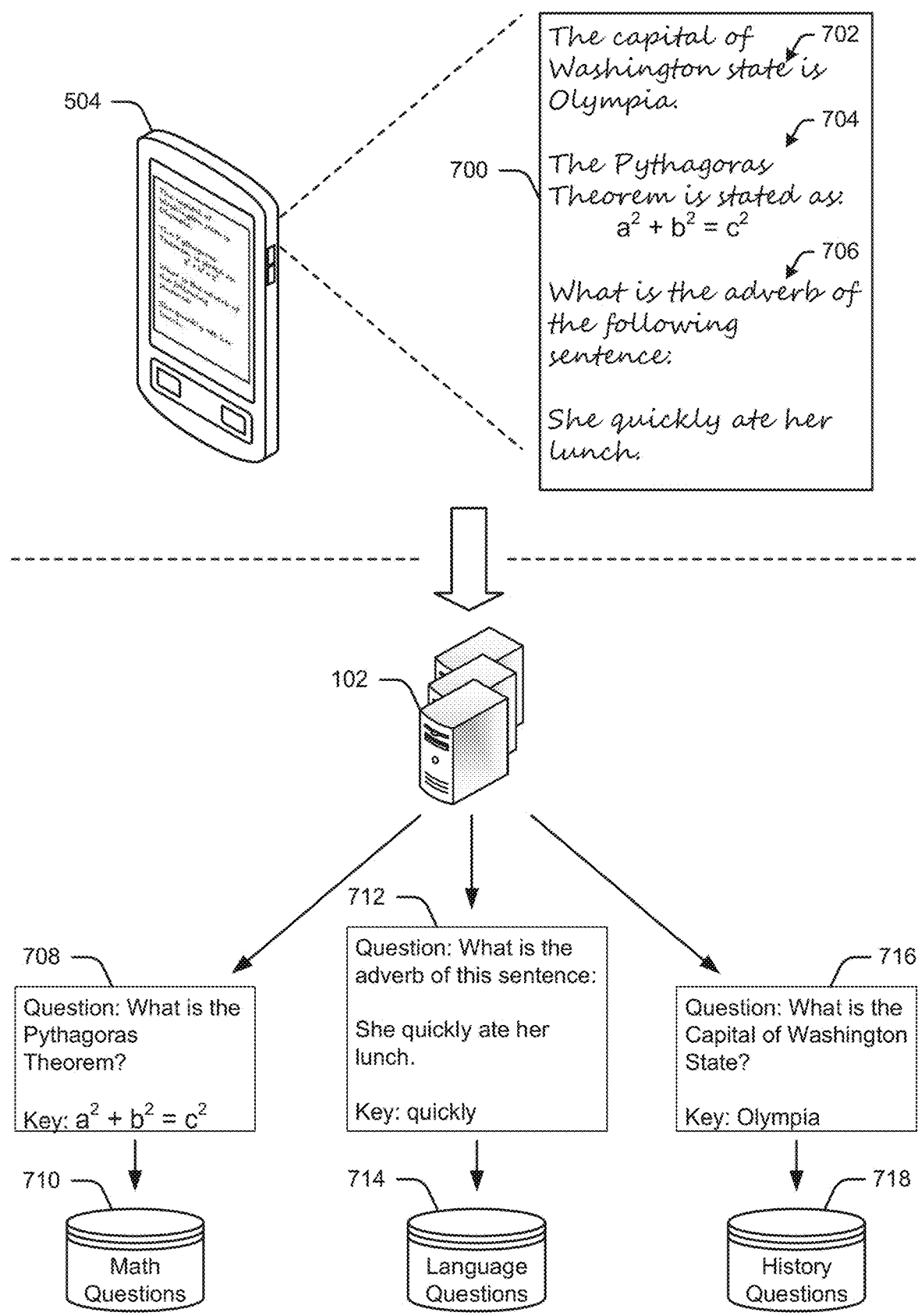
FIG. 7 illustrates an example of sorting test information in accordance with one or more implementations.

FIG. 7 illustrates an example progression of events over an arbitrary time period. Here, the progression begins in the upper portion of FIG. 7 and then moves to the lower portion of FIG. 7. It is to be appreciated that the progression of events described with respect to FIG. 7 is for discussion purposes, and that any other ordering, omission, and/or addition to the events can occur without departing from the scope of the claimed subject matter.

The upper portion of FIG. 7 of includes mobile phone 504 of FIG. 5a as well as document 700. Here, document 700 includes content that has a freeform handwriting format instead of machine-generated text. In other words, document 700 represents content that is captured through manual writing with a pen, pencil, etc. instead of a machine-generated document from typing. The content included in document 700 includes material that spans multiple topics and/or categories. For instance, content 702 corresponds to history/geography/social studies, while content 704 corresponds to math and content 706 corresponds to English/language. As further described herein, various implementations generate a digital image of document 700 using mobile phone 504 and generate a text-based description of the digital image. Various implementations then analyze the text-based description to not only identify and extract test information, but alternately or additionally determine how to categorize the test information. As one example, an analysis identifies that content 702 includes the phrase "Washington state", the term "capital", and so forth, and use this identification to determine that content 702 pertains to history. Alternately or additionally, various algorithms identify that content 704 includes superscripts, mathematical operation symbols, the term "Pythagoras", the term "Theorem", and so forth, and conclude that content 704 pertains to math. As another example, various algorithms identify that content 706 includes the term "adverb", the term "sentence", and so forth, and conclude that content 706 pertains to language. In turn, the corresponding test information can be sorted and/or categorized based on these identifications.

Moving to the lower portion of FIG. 7, servers 102 of FIG. 1 categorize and store the test information according to the respective identified topics. For example, test information 708 has partitioned content 704 into a question and an answer. In turn, the test information is categorized as math based upon the above analysis and stored in a database associated with that topic: math database 710. Some implementations alternately or additionally identify a sub-topic and/or learning level associated with test information 708 and group the test information with other questions having similar characteristics. As another example, test information 712 partitions content 706 into a question and an answer and is subsequently stored in language database 714. Finally, test information 716 partitions content 702 into a question and an answer and is stored in history database 718. In various implementations, database 710, database 714, and database 718 are representative of databases 118 of FIG. 1.

Figure 8:
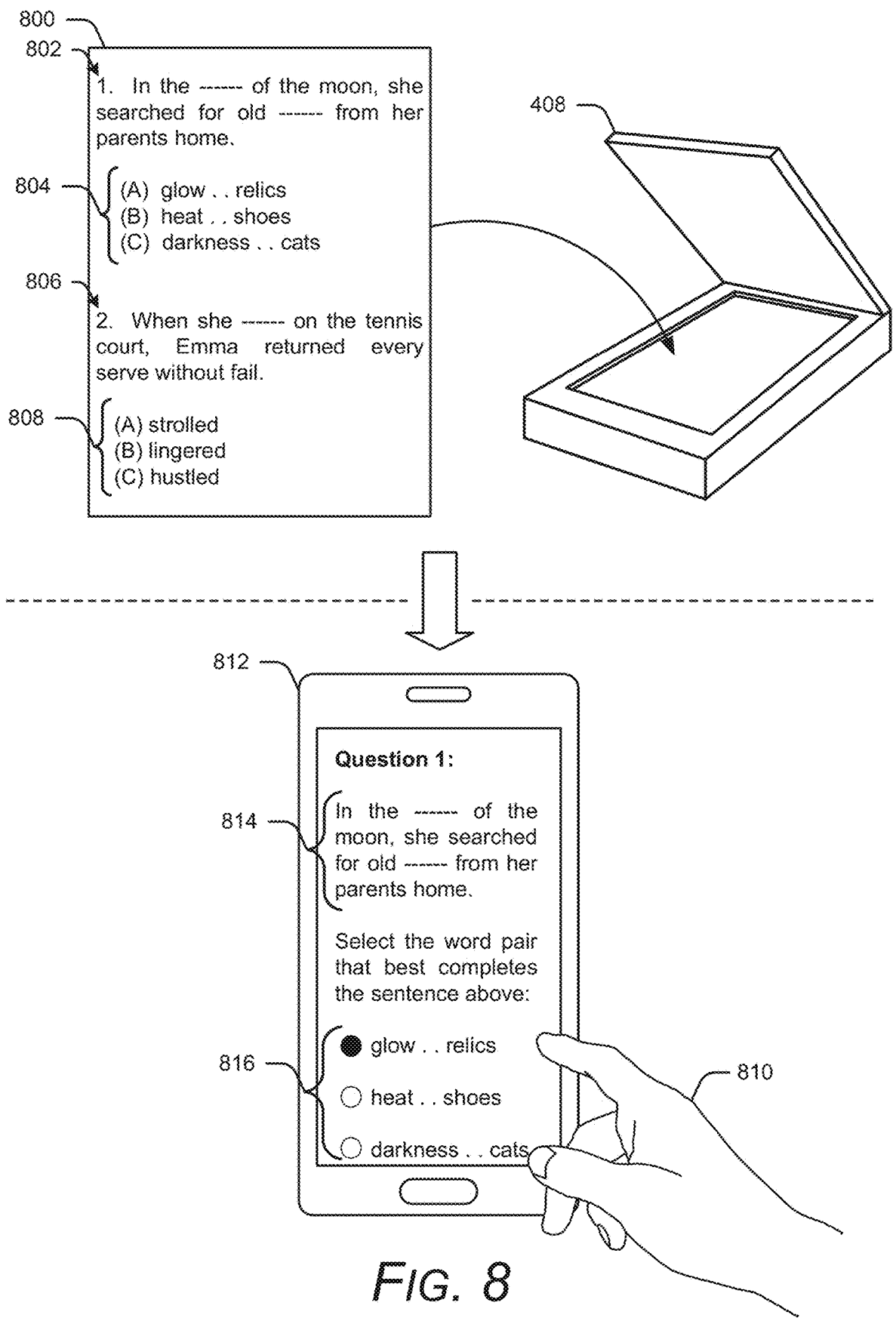
FIG. 8 illustrates an example of input subject matter that includes multiple questions and answers in accordance with one or more implementations.

As another example of parsing multiple questions from an image, consider now FIG. 8 that illustrates an example of extracting multiple test questions and answers from an image in accordance with one or more implementations. In various scenarios, the example described with respect to FIG. 8 can be considered a continuation of one or more examples described with respect to FIGS. 1-7.

FIG. 8 illustrates an example progression of events over an arbitrary time period. Here, the progression begins in the upper portion of FIG. 8 and then moves to the lower portion of FIG. 8. It is to be appreciated that the progression of events described with respect to FIG. 8 is for discussion purposes, and that any other ordering, omission, and/or addition to the events can occur without departing from the scope of the claimed subject matter.

The upper portion of FIG. 8 includes document 800 and scanner 408 of FIG. 4, where scanner 408 is used to generate an image of document 800 as static content input into the context-based testing system as further described herein. Here, document 800 includes multiple questions, each of which has a respective set of answers, also known as multiple-choice answers. For example, document 800 includes question 802 that corresponds to a language-based question, and answers 804 that correspond to the multiple-choice answers for question 802. Document 800 also includes question 806 and related multiple-choice answers 808. Various implementations analyze the corresponding image of document 800 (not illustrated here) to identify each respective question and multiple-choice answers associated with each question, such as indentations, numbering sequences, question content, key words, etc. With respect to document 800, some implementations identify the numeric sequence "1" associated with question 802 and then use this identification to determine that the text following "1" corresponds to a first instance of question content. Similarly, various implementations identify the numeric sequence "2" associated with question 806 and then use this identification to determine that the text following "2" corresponds to a second instance of question content.

Various implementations identify other characteristics as well, such as a spacing between question 802 and answers 804, a spacing between question 806, the block indentation of answers 804, the block indentation up of the answers 808, the character-based sequencing of answers 804 and/or answers 808 (e.g., A, B, C), and so forth. In turn, these characteristics can be used individually or in combination to determine that answers 804 correspond to multiple-choice answers associated with question 802, that answers 808 correspond to multiple-choice answers associated with question 806, and so forth. While document 800 is illustrated here as including two questions with associated multiple-choice answers, any combination and/or numbers of questions can be included in a document and/or image without departing from the scope of the claimed subject matter.

Moving to the lower portion of FIG. 8, user 810 is in process of taking a quiz based upon the questions included in document 800. Here, user 810 accesses the quiz via mobile phone 812 that represents an example implementation of computing device 106 of FIG. 1. Accordingly, mobile phone 812 administers testing content, such as question 814 that corresponds to question 802, and provides multiple-choice answers 816 that are based on answers 804. In turn, user 810 selects one of answers 816 via a touch-input gesture, which is then submitted to the context-based testing system.

Figure 9:
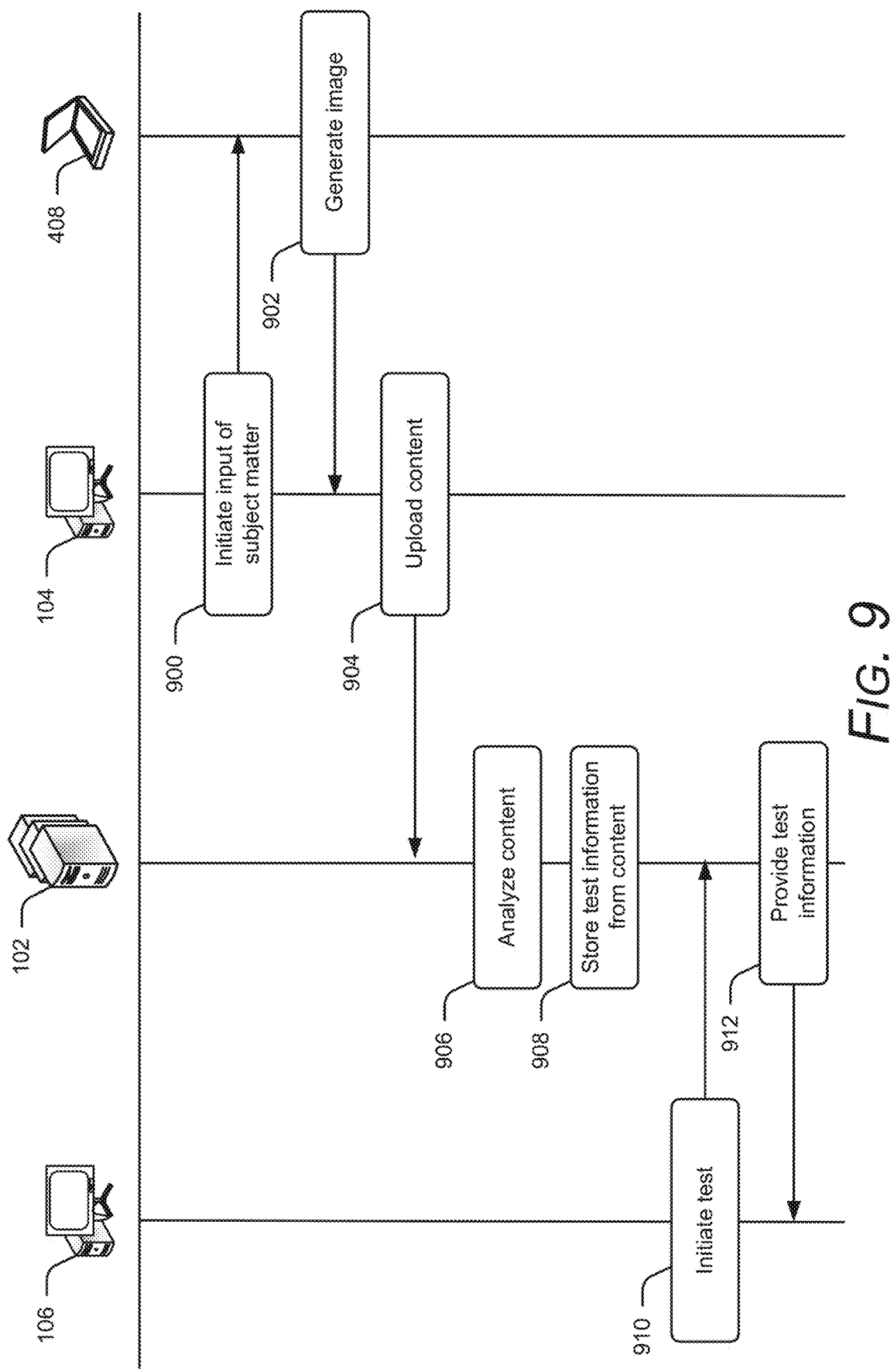
FIG. 9 illustrates an example of messaging between devices that can be used to provide context-based testing in accordance with one or more implementations.

Now consider FIG. 9 that illustrates example communication exchanges between devices in accordance with one or more embodiments. In various implementations, FIG. 9 represents a continuation of one or more examples described with respect to FIGS. 1-8b.

FIG. 9 includes servers 102, computing device 104, and computing device 106 of FIG. 1, as well as scanner 408 of FIGS. 4-8a. The respective vertical lines underneath each device corresponds to actions performed at that device. Thus, the vertical line beneath servers 102 corresponds to actions performed by the servers, the vertical line beneath computing device 104 corresponds to actions performed by a publisher device that receives input subject matter to parse, the vertical line beneath computing device 106 corresponds to actions performed by a student device that administers an electronic test, and the vertical line beneath scanner 408 corresponds to actions performed by the scanner. The horizontal action lines between the different devices represent communications across a network between the connected devices, such as through transmitting and receiving messages and/or the invocation of software functionality across devices using cloud-based services. While the communication exchanges described in FIG. 9 illustrate these exchanges in a particular order, it is to be appreciated that any specific order or hierarchy of the communication exchanges described here is used to illustrate an example of a sample approach. Other approaches may be used that rearrange the ordering of these steps. Thus, the steps described here may be rearranged, and the illustrated ordering of these steps is not intended to be limiting.

At 900, various implementations initiate the input of subject matter. For example, a publisher user can invoke a user interface associated with publishing module 124 of FIG. 1 to establish a connection with servers 102 and/or scanner 408. For example, if the user manually enters subject matter, a connection is established between computing device 104 and servers 102 as a way to transmit the newly entered subject matter. Alternately or additionally, if the user scans an image that includes the input subject matter, the publishing module 124 can establish a connection with scanner 408 to access the digital image. In this example, computing device 104 initiates the input of subject matter by communicating with scanner 408. Any type of message and/or request can be exchanged between the devices, such as a request, a command, a confirmation, and so forth. While illustrated here as a single exchange, it is to be appreciated that multiple messages can be exchanged between the devices without departing from the scope of the claimed subject matter.

At 902, scanner 408 generates a digital image and forwards the digital image to the requesting computing device (e.g., computing device 104). Alternately or additionally, scanner 408 forwards the digital image to servers 102 (not illustrated here). In response to receiving the digital image, various implementations upload content associated with the image to servers 102 at 904. This can include uploading the digital image and/or uploading a text-based description based on the digital image content to the servers.

At 906, one or more implementations analyze the content to identify various characteristics and/or input subject matter from the content, examples of which are provided herein. For instance, the analysis can identify mathematical equations, figures, charts, questions, possible answers, key answers, and so forth. In implementations where the servers receive a digital image, the analysis can include converting the digital image into a text-based description. In response to analyzing the content, one or more implementations store test information extracted from the content at 908. This can include storing the test information in database(s) based on an identified topic, sub-topic, learning level, and so forth.

At an arbitrary point in time later, computing device 106 initiates a test at 910. For example, computing device 106 can invoke a web browser and provide user authentication information (e.g., username, password, etc.) to log onto servers 102 via a web page. Alternately or additionally, computing device 106 can invoke a standalone application and enter the user authentication information to access tests provided by servers 102. Accordingly, in response to authenticating the user, servers 102 provide test information at 912. This can include providing customized test questions based upon context information as further described herein.

Figure 10:
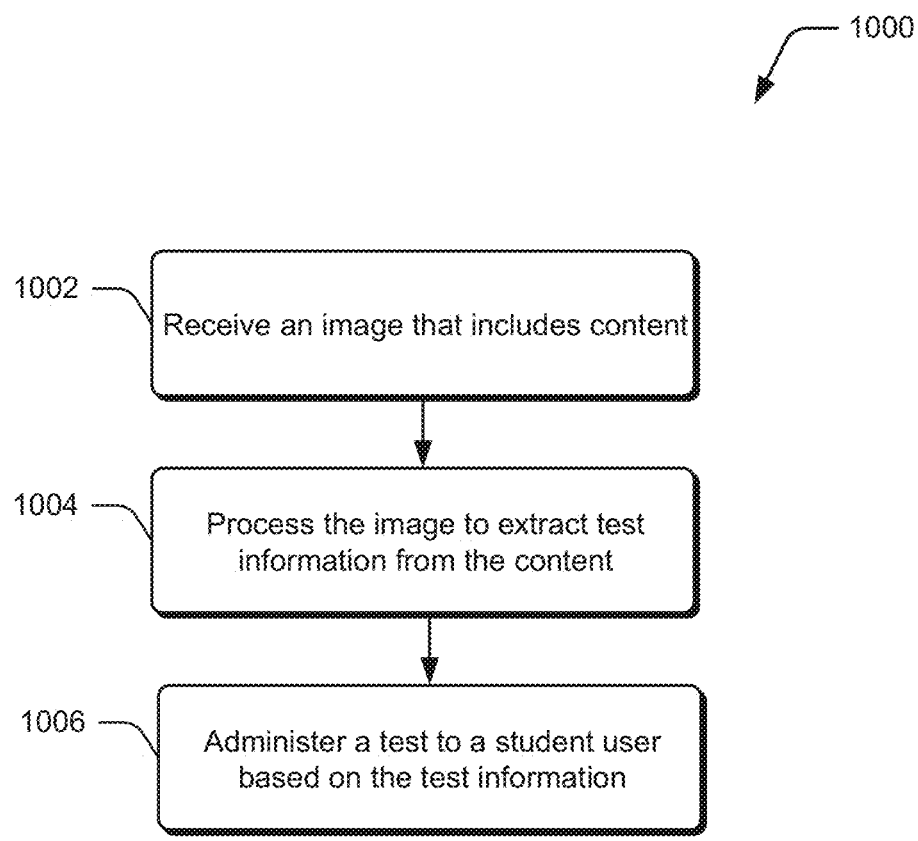
FIG. 10 illustrates a flow diagram that extracts test information from an image in accordance with one or more implementations.

FIG. 10 illustrates a method 1000 that processes image content to extract test information. The method can be performed by any suitable combination of hardware, software, and/or firmware. In at least some embodiments, aspects of the method can be implemented by one or more suitably configured hardware components and/or software modules, such as server testing module 108, publishing module 124, and/or client testing module 128 of FIG. 1. These modules can reside on separate computing devices and/or be integrated onto a single device as further described herein. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, one or more implementations received an image that includes content. For instance, some implementations utilize a camera integrated into a mobile phone, laptop, and/or tablet to capture a digital image. Alternately or additionally, various implementations utilize a scanner that is communicatively coupled to a computing device to generate a digital image. In turn, the image is uploaded into the context-based testing system. The image can include any suitable type of content, such as a document that includes multiple questions with respective multiple-choice answers, graphics, freehand content, mathematical equations, shapes, tables, and so forth. Some content includes questions and respective answers, while other content lacks the respective answers to questions.

In response to receiving the image, one or more implementations process the image to extract test information from the content at 1004. For example, some implementations convert the image into a text-based format by applying an OCR algorithm. Some implementations alternately or additionally convert the graphics included in the image into text-based descriptions, examples of which are provided herein. In turn, test information is extracted from the image, such as by analyzing the text-based format of the image for various identifying characteristics (e.g., block indentations, sequencing, language structure, subscripts, superscripts, etc.). The analyzing can alternately or additionally include identifying a topic and/or sub-topic associated with the test information, a learning level associated with the test information, and so forth, such that the test information is sorted and/or stored based on the identified characteristics. The extracted test information can include questions, answers, and/or learning material.

At 1006, various implementations administer a test to a student user based on the text information extracted from the content included in the image. In some scenarios, the test information is administered as static questions and/or answers to the student user such that the administered question reflects the content included in the test information. Alternately or additionally, the test information is used as a basis for dynamically generated test questions as further described herein. In administering the test, some implementations use the text-based description of the graphic(s) included in the image to redraw the graphic, such as by converting a freehand shape into a machine-generated shape.

Having described various aspects of parsing input static content, consider now a discussion of dynamically generating test content in accordance with one or more implementations.

Dynamic Generation of Test Content

Various implementations provide publishers with the ability to enter static content into the context-based testing system, such as by capturing an image of a document that includes the static content. The context-based testing system then parses the image using various techniques to identify various characteristics about the content. In turn, these characteristics can be used to extract questions and/or answers from the content. However, some implementations use the static content as a basis for dynamically generated content. For example, the static content can be submitted to a machine learning algorithm for analysis. In turn, the analysis can be used to dynamically generate testing content. The phrase "dynamically generating" is used to denote the context-based testing system automatically generating test information (e.g., questions, answers, learning material, etc.). In various implementations, the dynamic generation occurs while the test information is being administered to a student user. Alternately or additionally, various implementations dynamically generate the test information while operating in batch mode and/or offline mode (e.g., not actively administering test information to the student user/recipient) to accumulate the test information in anticipation of future deployment to student users.

Figure 11A:
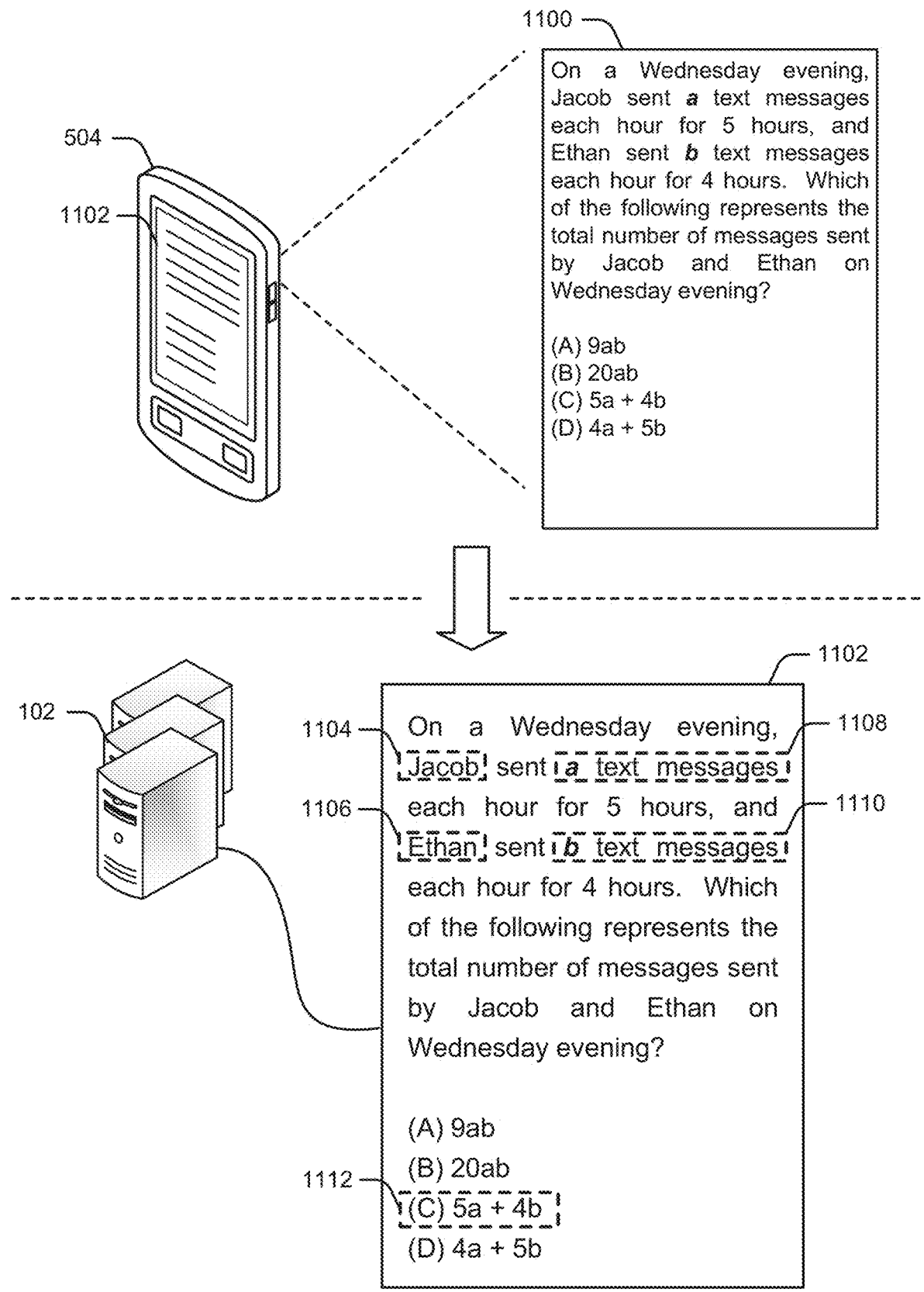
FIGS. 11a and 11b illustrates an example of dynamically generating test information in accordance with one or more implementations.
Figure 11B:
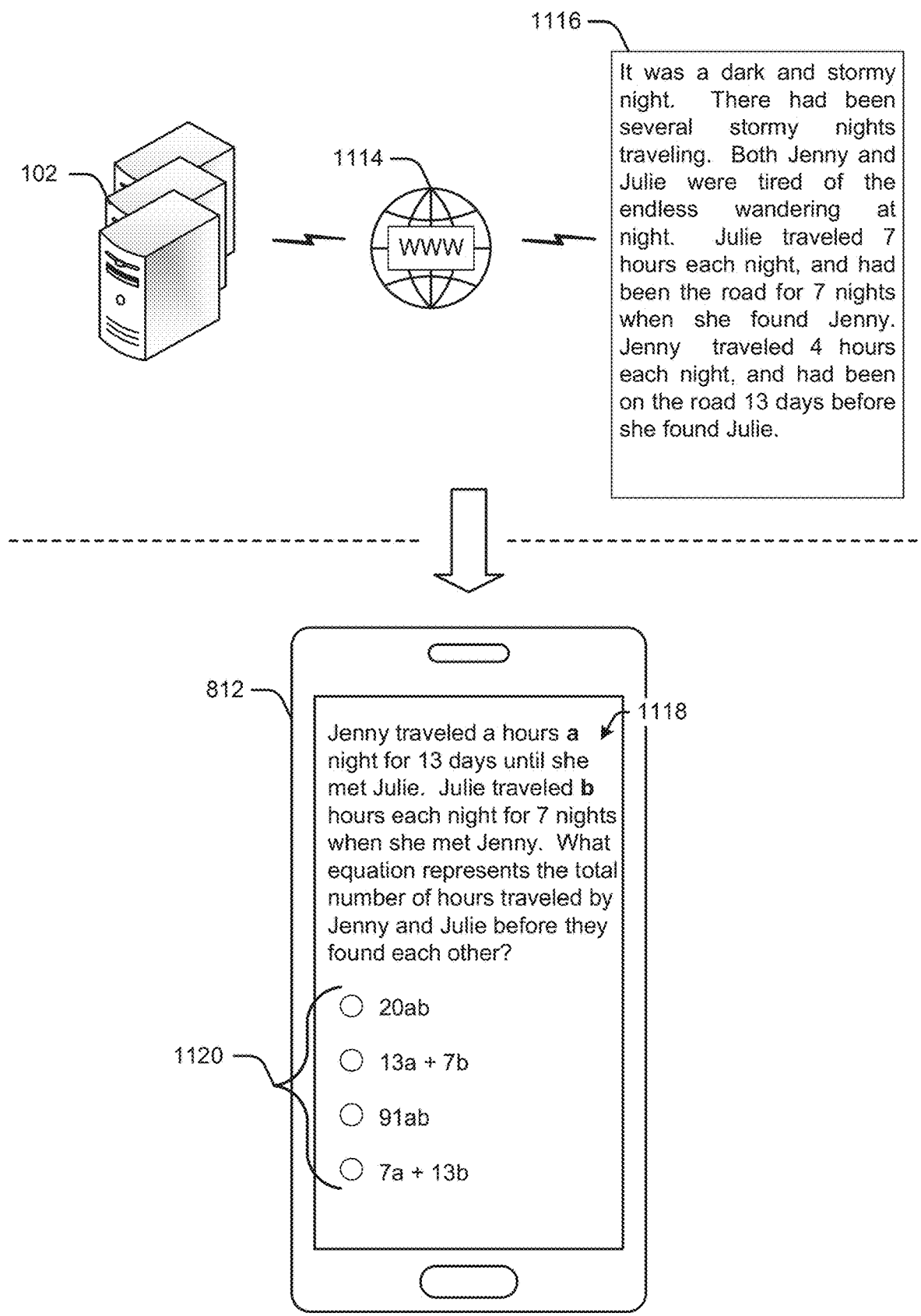

To further demonstrate, consider now FIGS. 11*a* and 11*b* that illustrate an example of dynamically generating testing content in accordance with one or more implementations. In various scenarios, the example described with respect to FIGS. 11*a* and 11*b* can be considered a continuation of one or more examples described with respect to FIGS. 1-10.

FIGS. 11*a* and 11*b* collectively illustrate an example progression of events over an arbitrary time period. Here, the progression begins in the upper portion of FIG. 11*a* and then moves to the lower portion of FIG. 11*a*. The progression then moves to the upper portion of FIG. 11*b*, followed by the lower portion of FIG. 11*b*. It is to be appreciated that the progression of events described with respect to FIGS. 11*a* and 11*b* is for discussion purposes, and that any other ordering, omission, and/or addition to the events can occur without departing from the scope of the claimed subject matter.

The upper portion of FIG. 11*a* includes mobile phone 504 of FIG. 5 and document 1100. In various implementations, mobile phone 504 captures an image 1102 of document 1100 and submits the image to a context-based testing system as static content as further described herein. Accordingly, various implementations analyze the content associated with document 1100 to identify questions, identify answers, identify learning material, generate text-based descriptions of images, and so forth. Various implementations alternately or additionally submit the static content to a machine learning algorithm to learn additional properties about the content.

Moving to the lower portion of FIG. 11*a*, servers 102 have received the image submitted via mobile phone 504 and begin to analyze the content associated with the image. While described in the context of using two separate devices (e.g., mobile phone 504 and servers 102) to perform the image capture and analysis, alternate implementations integrate the described functionality onto a single device. In various implementations, the analysis includes using machine-learning algorithms to characterize the content. For example, the analysis first determines that the text included in the associated content corresponds to a math problem and/or a math topic. Next, the analysis determines that the content includes two actors and/or persons in the math problem: person 1104 and person 1106. Further the analysis identifies that the involved variables correspond to text messages, which is based on excerpt 1108 and excerpt 1110. The analysis also ascertains that the content relates to linear equations based upon answer 1112. It is to be appreciated that the characteristics and/or context identified by the analysis in this example are for discussion purposes, and that any other type of characteristic and an identified in use to describe the context of content without departing from the scope of the claimed subject matter.

Moving to the upper portion of FIG. 11*b*, various implementations use the learned characteristics to identify new content. For example, servers 102 use the newly learned characteristics to search the World Wide Web (WWW) 1114 for publicly available content and/or documents that match the learned characteristics. Any suitable type of content and/or documents can be analyzed in the search, such as online magazines, stored books, web sites, blogs, Wikipedia™, educational web sites, and so forth. In this example, servers 102 determine that document 1116 has characteristics that exactly match and/or closely match (within a predetermined threshold) the learned characteristics. Upon finding matching, or closely matching, content, various implementations dynamically generate new test information using the newly located content.

Moving to the lower portion of FIG. 11*b*, mobile phone 812 of FIG. 8 administers test information that has been dynamically generated. For example, question 1118 includes verbiage extracted from document 1116 that has been modified to generate a linear equation-based question. Similarly, multiple-choice answers 1120 correspond to the content included in document 1116, but have alternately or additionally been modeled on the answers included in image 1102, such as answer 1112. Accordingly, by using static content as a baseline and/or input content to train a machine-learning algorithm, various implementations dynamically generate new testing information (e.g., questions, answers, learning material, etc.).

While the example described with respect to FIGS. 11*a* and 11*b* describes dynamically generating math questions corresponding to linear equations, other types of test information can be dynamically generated. For example, language content can be analyzed to identify and/or determine the focus of the question, such as word association, sentence pattern, organization, word transitions, punctuation, sentence structure, effective language use, and so forth. In turn, various implementations dynamically generate questions directed towards the determined focus. Similarly, math content can be analyzed to determine a corresponding focus (e.g., geometry, calculus, non-linear equations, etc.) such that questions can be dynamically generated for the determined focus. Thus, different topics can be analyzed dynamically generate test information.

Figure 12:
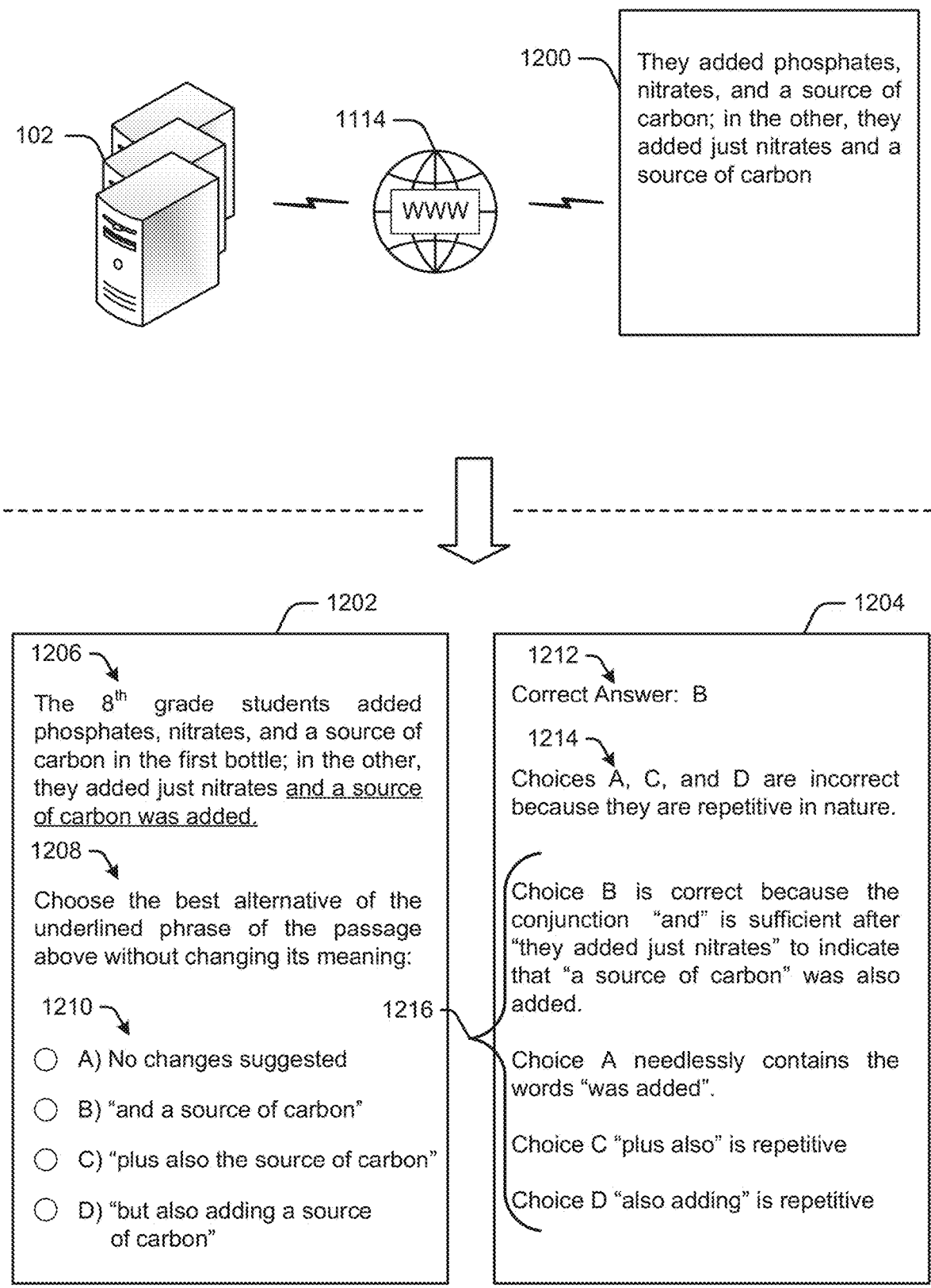
FIG. 12 illustrates an example of dynamically generating test information in accordance with one or more implementations.

To demonstrate, consider now FIG. 12 that illustrates an example of dynamically generating language-based questions in accordance with one or more implementations. In various scenarios, the example described with respect to FIG. 12 can be considered a continuation of one or more examples described with respect to FIGS. 1-11*b*.

FIG. 12 illustrates an example progression of events over an arbitrary time period. Here, the progression begins in the upper portion of FIG. 12 and then moves to the lower portion of FIG. 12. It is to be appreciated that the progression of events described with respect to FIG. 12 is for discussion purposes, and that any other ordering, omission, and/or addition to the events can occur without departing from the scope of the claimed subject matter.

The upper portion of FIG. 12 includes servers 102 of FIG. 1 that search the WWW 1114 of FIG. 11*b* to identify passages that are suitable to use as a basis for dynamically generated English questions, such as grammar-based questions, punctuation-based question, verb conjugation-based questions, etc. While illustrated here as servers 102 searching the WWW, alternate or additional implementations perform the searching using a student computing device and/or a publisher computing device. As further described herein, the search includes scanning publicly available content from any suitable location. Accordingly, servers 102 locate passage 1200 and determine to convert the corresponding content into a question format, such as a multiple-choice based question, a fill-in-the-blank question format, etc. As one example, various implementations analyze passage 1200 to verify the grammar accuracy of the text include in the passage, and then find a part of the content to convert in the question.

Moving to the lower portion of FIG. 12, dynamically generated question 1202 represents an example question generated by servers 102 based on passage 1200, while dynamically generated answer 1204 represents a dynamically answer generated by the context-based testing system. In this example, the context-based testing system determines to dynamically generate grammar-based questions directed towards testing "Words in Context", where the user is asked to choose the best words based on the text surrounding them to make the passage more precise, improve the syntax, improve the tone, etc. In turn, the system generates new passage 1206, question 1208, and possible answers 1210. Various implementations construct multiple alternatives of new passage 1206 and can use any one of the multiple alternatives in place of the original passage.

Dynamically generated answer 1204 includes multiple descriptions that explain the correct answer choice to question 1208. For example, the system first identifies correct choice 1212, as well as incorrect choices 1214. The dynamically generated answer also includes additional explanations 1216 that provide additional detail on why correct choice 1212 is the correct answer and why incorrect choices 1214 are not. This combination of information allows the context-based system to dynamically alter what learning material is provided to the user based upon an identified learning level as further described herein.

In some scenarios, the input content fails to provide a corresponding answer to the input question. For example, referring to document 800, the content can be analyzed to identify answers 804 and/or answers 808, but the content does not specify which selection is the correct selection. Various implementations dynamically identify the correct answer to input questions, such as through the use of statistical analysis.

Figure 13A:
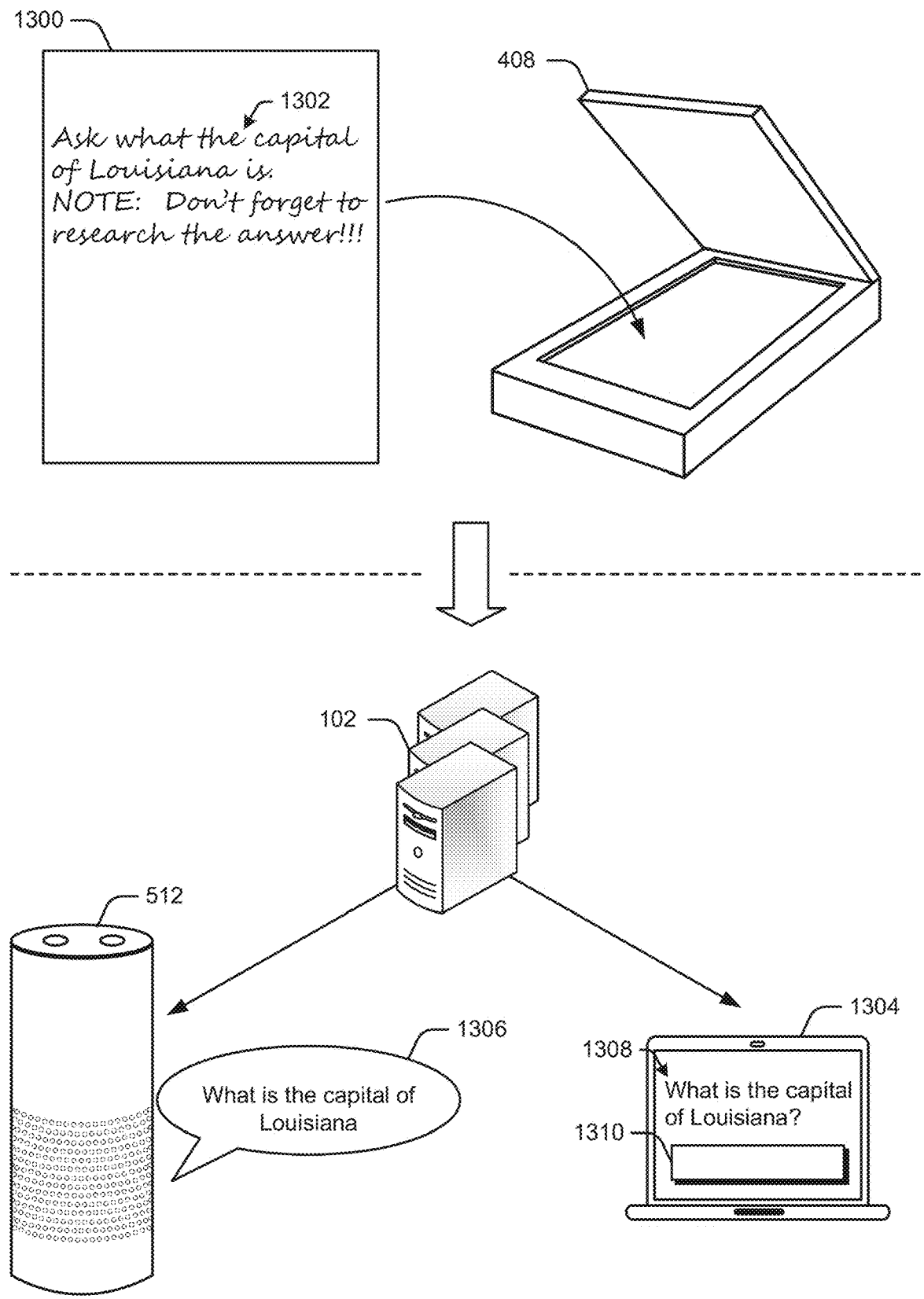
FIGS. 13a and 13b illustrate an example of determining a statistically generated answer to a question in accordance with one or more implementations.
Figure 13B:
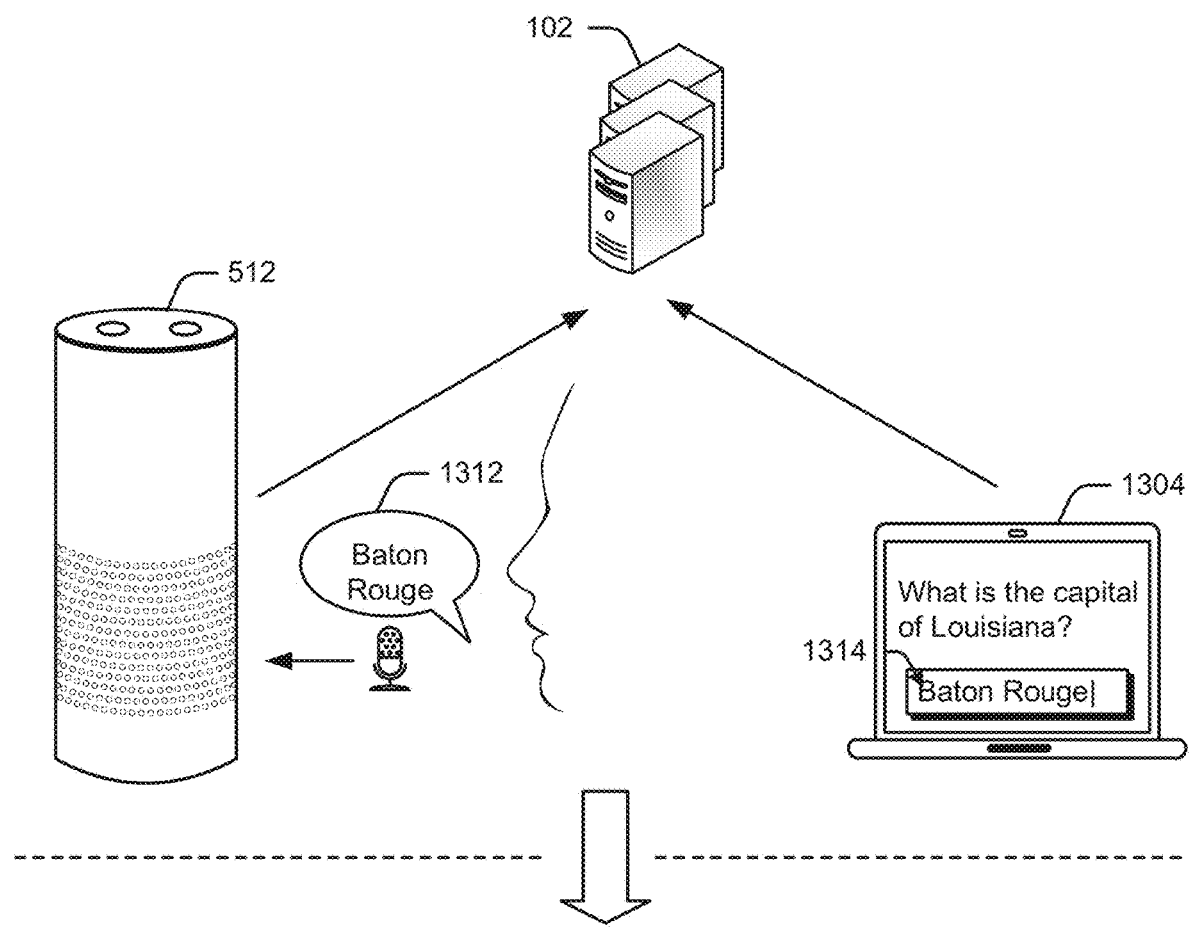
Figure 13B:
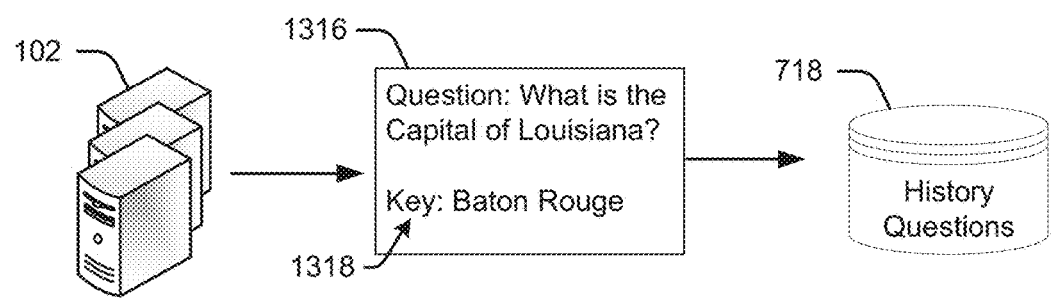

To further demonstrate, consider now FIGS. 13*a* and 13*b* that illustrate an example of identifying correct answers in accordance with one or more implementations. In various scenarios, the example described with respect to FIGS. 13*a* and 13*b* can be considered a continuation of one or more examples described with respect to FIGS. 1-12. Collectively, FIGS. 13*a*-13*b* illustrate an example progression of events over an arbitrary time period. In this example, the progression begins in the upper portion of FIG. 13*a* and then moves to the lower portion of FIG. 13*a*. The progression then proceeds to the upper portion of FIG. 13*b*, followed by the lower portion of FIG. 13*b*. It is to be appreciated that the progression of events described with respect to FIGS. 13*a* and 13*b* are for discussion purposes, and that any other ordering, omission, and/or addition to the events can occur without departing from the scope of the claimed subject matter.

The upper portion of FIG. 13*a* includes scanner 408 of FIG. 4 and document 1300. Here, document 1300 includes content 1302 that has a freeform handwriting format instead of machine-generated text. As further described herein, scanner 408 generates a digital image that is then used to generate a text-based description that includes the content of document 1300. Here, content 1302 includes question content (e.g., "Ask what the capital of Louisiana is") but lacks a subsequent answer to the question. Various implementations use statistical analysis to identify an answer to questions that lack an identified answer when entered into the context-based testing system.

Moving to the lower portion of FIG. 13a, servers 102 identify that the test information generated from content 1302 lacks an answer to the corresponding question. Accordingly, in various implementations, the context-based testing system selects particular users to build an answer to the question. For example, in response to identifying that content 1302 can be categorized as historical content, servers 102 access user profiles to determine which student users associated with the system excel and/or have higher test scores in history related testing relative to other student users. Here, servers 102 has identified two student users that are statistically more likely to answer history questions correctly relative to other student users, but any number of student users can be utilized without departing from the scope of the claimed subject matter. In response to selecting the two student users, the servers deploy a test question extracted from content 1302 to user devices associated with the student users. Here, home assistant device 512 of FIG. 5b is associated with a first student user while laptop 1304 is associated with a second student user. In this example, home assistant device 512 delivers an audible question 1306 that corresponds to the test question, while laptop 1304 displays question 1308 with a corresponding text field 1310.

Moving to the upper portion of FIG. 13b, home assistant device 512 receives audible answer 1312, while laptop 1304 receives answer 1314 via the corresponding text field. In turn, these answers are transmitted to servers 102 for analysis. For example, servers 102 can collectively analyze all answers received in response to the test question associated with content 1302 and select a statistically-learned answer from the collection that has the highest probability of being the correct answer relative to other answers. This is further illustrated in the lower portion of FIG. 13b, where servers 102 store test information 1316 that includes statistically generated answer 1318 in database 718 of FIG. 7.

Figure 14:
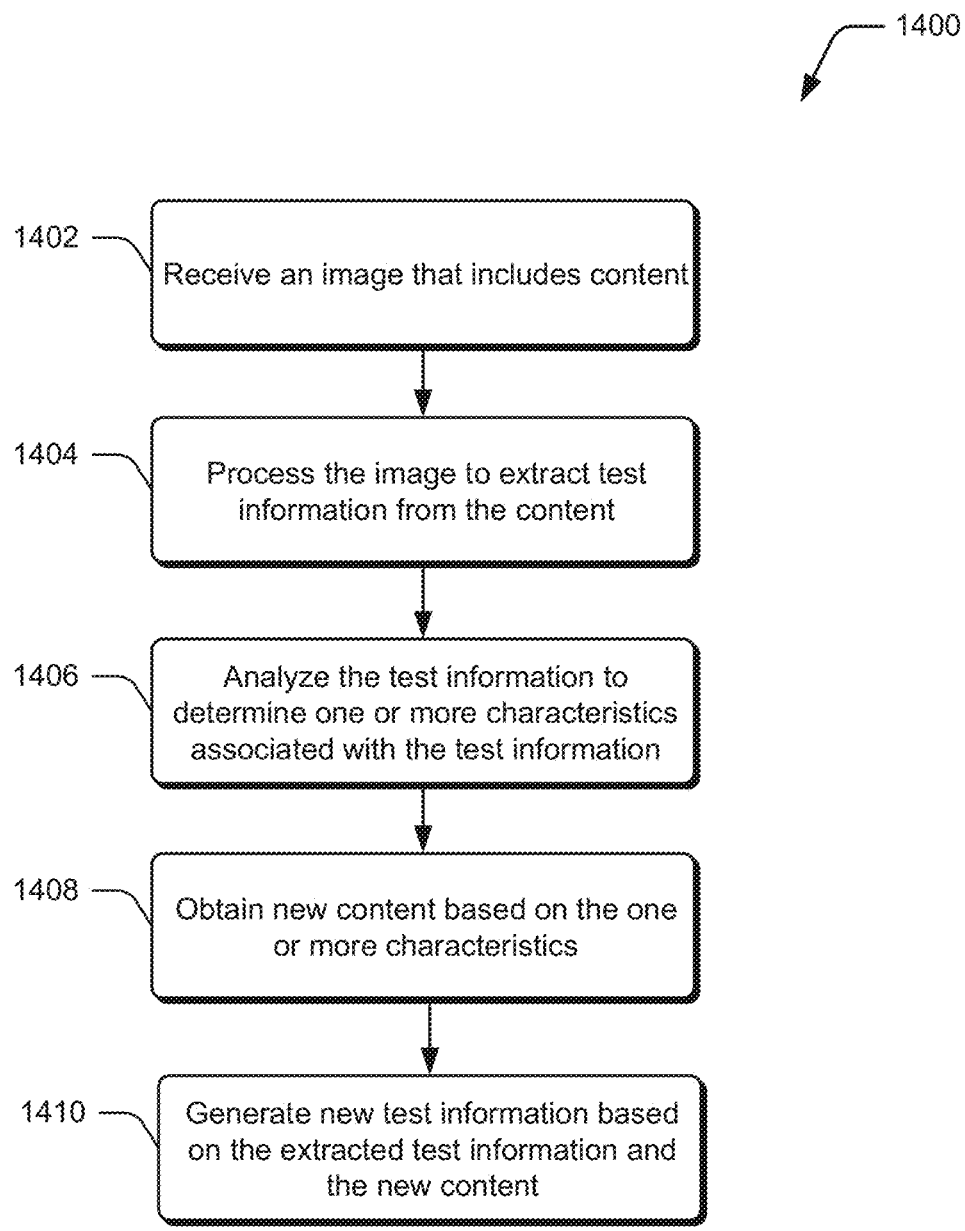
FIG. 14 illustrates a flow diagram that dynamically generates test information in accordance with one or more implementations.

FIG. 14 illustrates an example method 1400 that dynamically generates new test information. The method can be performed by any suitable combination of hardware, software, and/or firmware. In at least some embodiments, aspects of the method can be implemented by one or more suitably configured hardware components and/or software modules, such as server testing module 108, publishing module 124, and/or client testing module 128 of FIG. 1. These modules can reside on separate computing devices and/or be integrated onto a single device as further described herein. While the method described in FIG. 14 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1402, various implementations receive an image that includes content. As further described herein, some implementations utilize a camera integrated into a mobile phone, laptop, tablet, and/or a scanner to capture a digital image that is then uploaded into the context-based testing system. The image can include any suitable type of content, such as multiple questions with respective multiple-choice answers, graphics, freehand content, mathematical equations, shapes, tables, and so forth. Some content includes questions and respective answers, while other content lacks the respective answers to questions.

In response to receiving the image, various implementations process the image to extract test information from the content at 1404, such as by using an OCR algorithm to convert the image into a text-based format, generating text-based descriptions of graphics included in the image, and so forth. The processing can include analyzing the text-based format, such as by applying various types of machine-learning algorithms to identify number sequencing, indentation blocks, spacing, and so forth, as a way to identify questions and/or answers included in the content.

At 1406 some implementations analyze the test information to determine one or more characteristics associated with the test information. For example, in response to identifying a question at 1404, various implementations then analyze the question to identify an associated subject matter topic (e.g., math, history, English, zoology, etc.), sub-topic (e.g., linear equations, geometry, language comprehension, punctuation, etc.), included language patterns, equation characteristics, variable identification, and so forth. In some scenarios, the question is analyzed to determine an associated learning level, such as by analyzing and identifying the number of concepts included in the question. Various implementations utilize one or more machine-learning algorithms to identify the various characteristics as further described herein.

At 1408, and in response to determining the one or more characteristics, various implementations obtain new content based on the one or more characteristic. For example, in response to identifying various language patterns included in the test information, some implementations search the WWW, a network, the Internet, etc., for documents or other types of content that include some or all of the same characteristics associated with the test information. This can include applying one or more machine-learning algorithms to identify content that has characteristics that match and/or are similar within predetermined deviation.

In response to obtaining new content, various implementations generate new test information based on the extracted test information and the new content. This can include generating test information at a same learning level, based on a same topic and/or subtopic, and so forth. In turn, the new test information is administered to a student user as further described herein. Various implementations alternately or additionally determine a statistically generated answer to the new test information and/or the extracted information, examples of which are provided herein.

Having described various aspects of dynamically generating test information, consider now a discussion of dynamically adapting test information in accordance with one or more implementations Dynamically Adapting Test Information In various implementations, publisher users input static test content into a context-based testing system by scanning the content to generate a digital image. In turn, the digital image can be partially or fully converted into a text-based description that is then analyzed to extract questions and/or answers without further user input. For example, the analysis can recognize various characteristics associated with the text-based format, such as indentations, numbering sequences, question content, key words, etc., and use these characteristics to identify the questions and/or corresponding answers. Alternately or additionally, these characteristics can be used to dynamically generate new test content, such as by matching some or all of the identified characteristics to content external to the context-based testing and using the external content to dynamically generate new content. Various implementations alternately or additionally store the extracted test information and/or dynamically generated test content based on identified topics, sub-topics, learning levels, and so forth. In turn, this allows the context-based testing system to provide and adapt tests dynamically to student users.

Figure 15:
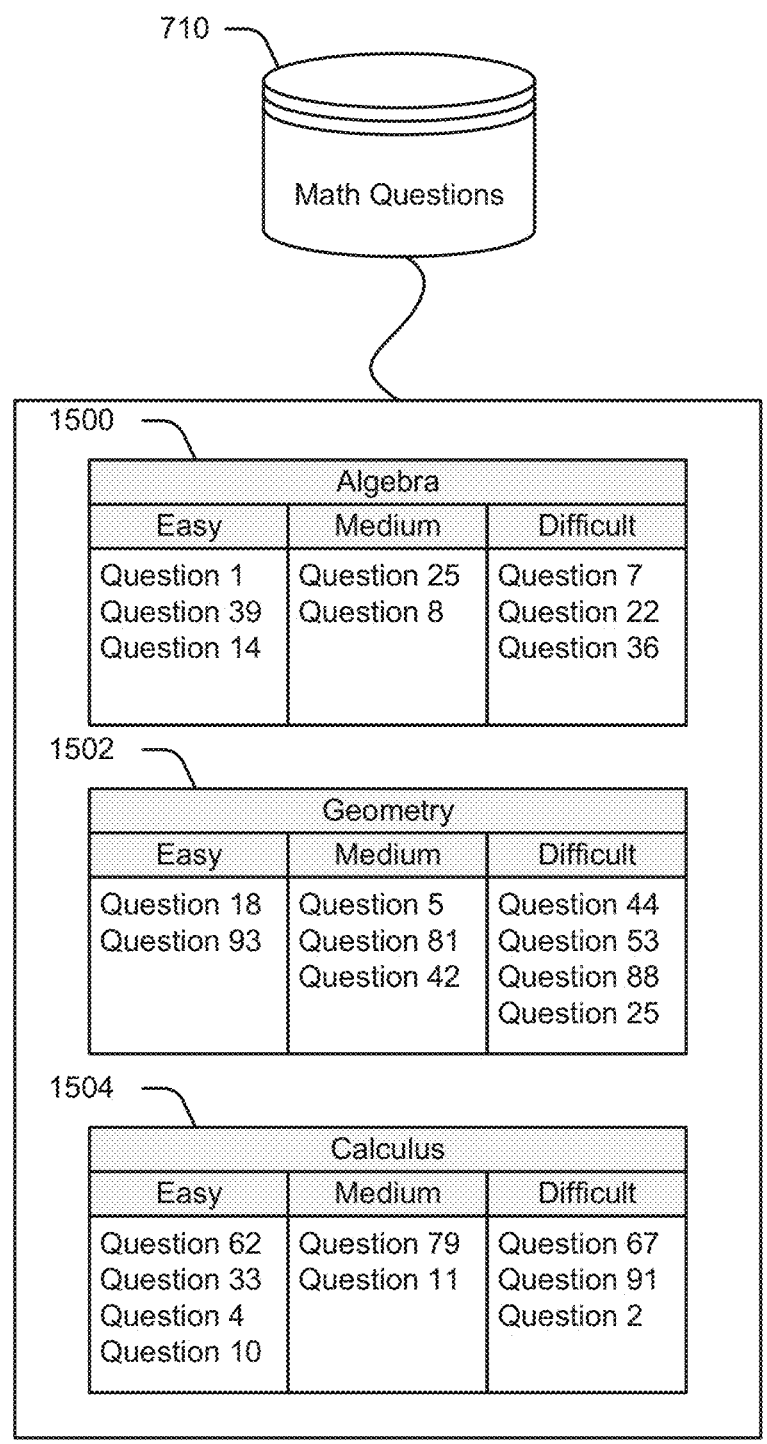
FIG. 15 illustrates an example of sorting test information based upon one or more characteristics in accordance with one or more implementations.

To further demonstrate, consider now FIG. 15 that illustrates an example of storing and/or grouping test questions based on various categorizations in accordance with one or more implementations. In various scenarios, the example described with respect to FIG. 15 can be considered a continuation of one or more examples described with respect to FIGS. 1-14.

FIG. 15 includes math database 710 of FIG. 7 that stores test information based upon an assigned topic and/or category. Here, math database 710 is illustrated as partitioning math test information into three separate subtopics. For example, table 1500 pertains to a math sub-topic corresponding to algebra, table 1502 pertains to a math sub-topic corresponding to geometry, and table 1504 pertains to a math sub-topic corresponding to calculus. However, it is to be appreciated that additional partitioning can be applied to test information without departing from the scope of the claimed subject matter. For example, some implementations further categorize and/or partition Algebra into alternate or additional sub-topics, such as linear algebra, polynomials, series expansion, elementary algebra, and so forth. As another example, some implementations further categorize and/or partition Geometry into alternate or additional sub-topics, such as concurrent lines, complementary angles, Cartesian plane, non-Euclidean geometry, etc. Thus, test information can be categorized, partitioned, and/or grouped in any suitable manner, and it is to be appreciated that the categorization and/or partitioning illustrated here is not intended to be limiting.

Each table illustrated in FIG. 15 has been partitioned into three sub-categories that pertain to a learning level: easy, medium, and difficult. For example, with respect to table 1504, question 62, question 33, question 4, and question 10 are grouped and/or categorized in the easy sub-category, while question 79 and question 11 are categorized into the medium sub-category. Finally, table 1404 categorizes question 67, question 91, and question 2 into the difficult sub-category. While described in the context of sorting and storing questions based upon learning levels, it is to be appreciated that alternate or additional test information can be sorted and stored as well, such as characteristics used to dynamically generate new questions, learning material, answers, and so forth. The assignment of the difficulty level of the test information can be achieved in any suitable manner, such as through identified content included in the test information and/or through an analysis of how different users respond to the question as further described herein. Some implementations assign a difficulty level to the test information based upon a number of identified concepts included in a corresponding question. By grouping the test information by a topic, sub-category, and learning level, various implementations can dynamically customize the test taking process users based upon an identified learning level of a student user.

Figure 16:
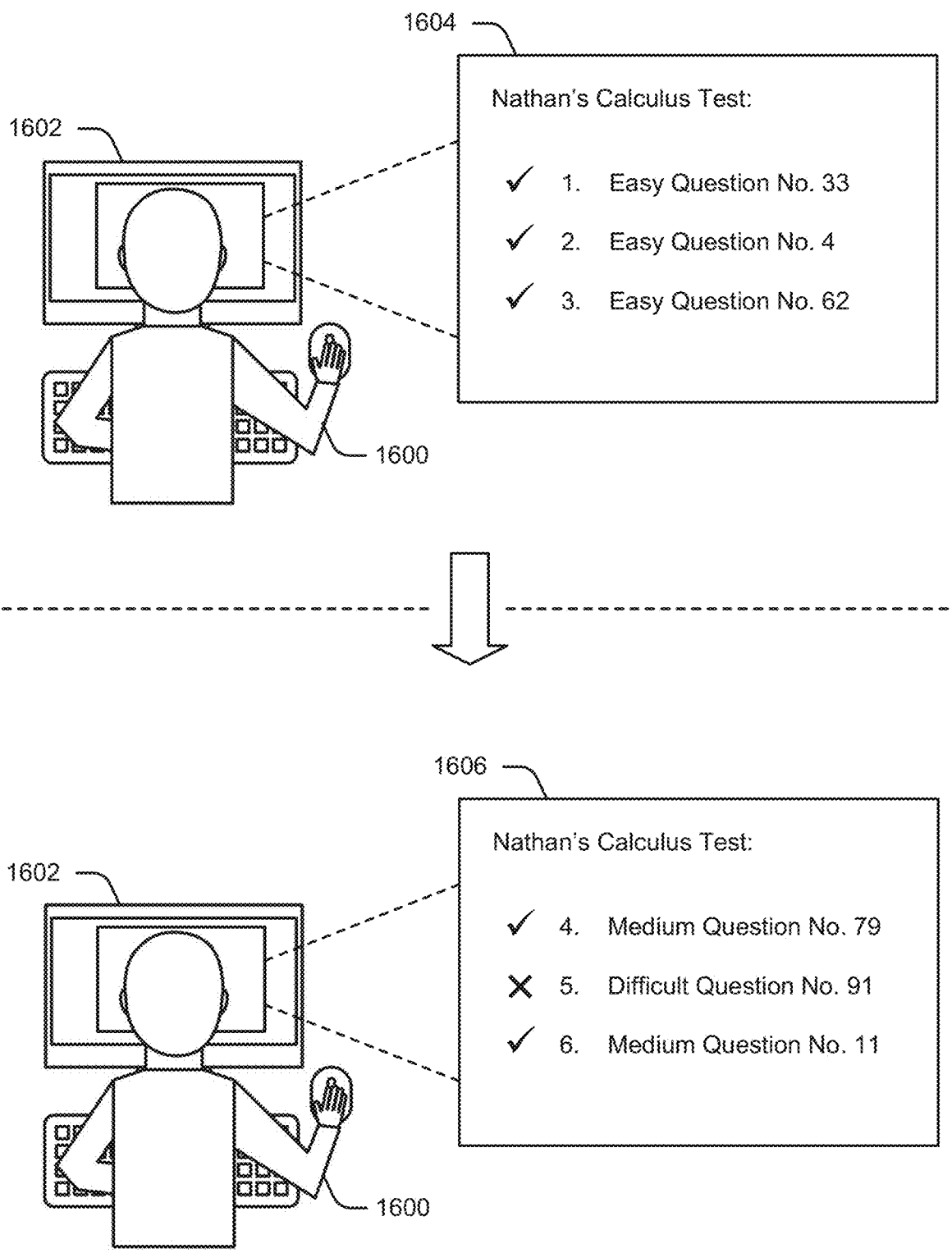
FIG. 16 illustrates an example of dynamically adapting a test based on context information in accordance with one or more implementations.

To further demonstrate, consider now FIG. 16 that illustrates an example of targeted test content in accordance with one or more implementations. In various scenarios, the example described with respect to FIG. 16 can be considered a continuation of one or more examples described with respect to FIGS. 1-15.

FIG. 16 illustrates an example progression of events over an arbitrary time period. Here, the progression begins in the upper portion of FIG. 16 and then moves to the lower portion of FIG. 16. It is to be appreciated that the progression of events described with respect to FIG. 16 is for discussion purposes, and that any other ordering, omission, and/or addition to the events can occur without departing from the scope of the claimed subject matter.

In the upper portion of FIG. 16, student user 1600 is in process of taking a context-based test via computing device 1602. Here, computing device 1602 is illustrated as a desktop computer that displays test information via a display device and receives user input via a keyboard and mouse. However, other implementations can include a home assistant device that administers test information audibly, a tablet that receives touch input, a smart phone that includes a stand-alone context-based test application, and so forth. Here, student user 1600 has logged into the context-based testing system by providing authentication information and has selected to test in the math sub-topic identified as Calculus.

Various implementations select and/or administer test information based on a particular student user and/or various characteristics associated with the particular student user. For example, consider a scenario in which student user 1600 is testing in the Calculus sub-topic of math for the first time. Since this is the first test associated with the student user for Calculus, the context-based testing system lacks any context information that indicates what learning level to provide. Accordingly, the context-based testing system determines to include test information categorized as easy in context-based test 1604. However, as the student user answers the corresponding test questions, the context-based test system gathers context information that can be used to dynamically learn what learning level the student user is at for the current topic and/or sub-topic. For example, in the upper portion of FIG. 16, the student user answers question 1, question 2, and question 3 correctly. The context-based testing system evaluates these responses and determines that the learning level of student user 1600 is at least at the easy level. To advance knowledge in the associated subject matter, some implementations dynamically modify what level of questions are administered to the student user without user input specifically directed to increase the learning level. In other words, the determination to modify the learning level is based on how the student user answers the test questions, rather than the student user changing a setting associated with the learning level.

Figure 17:
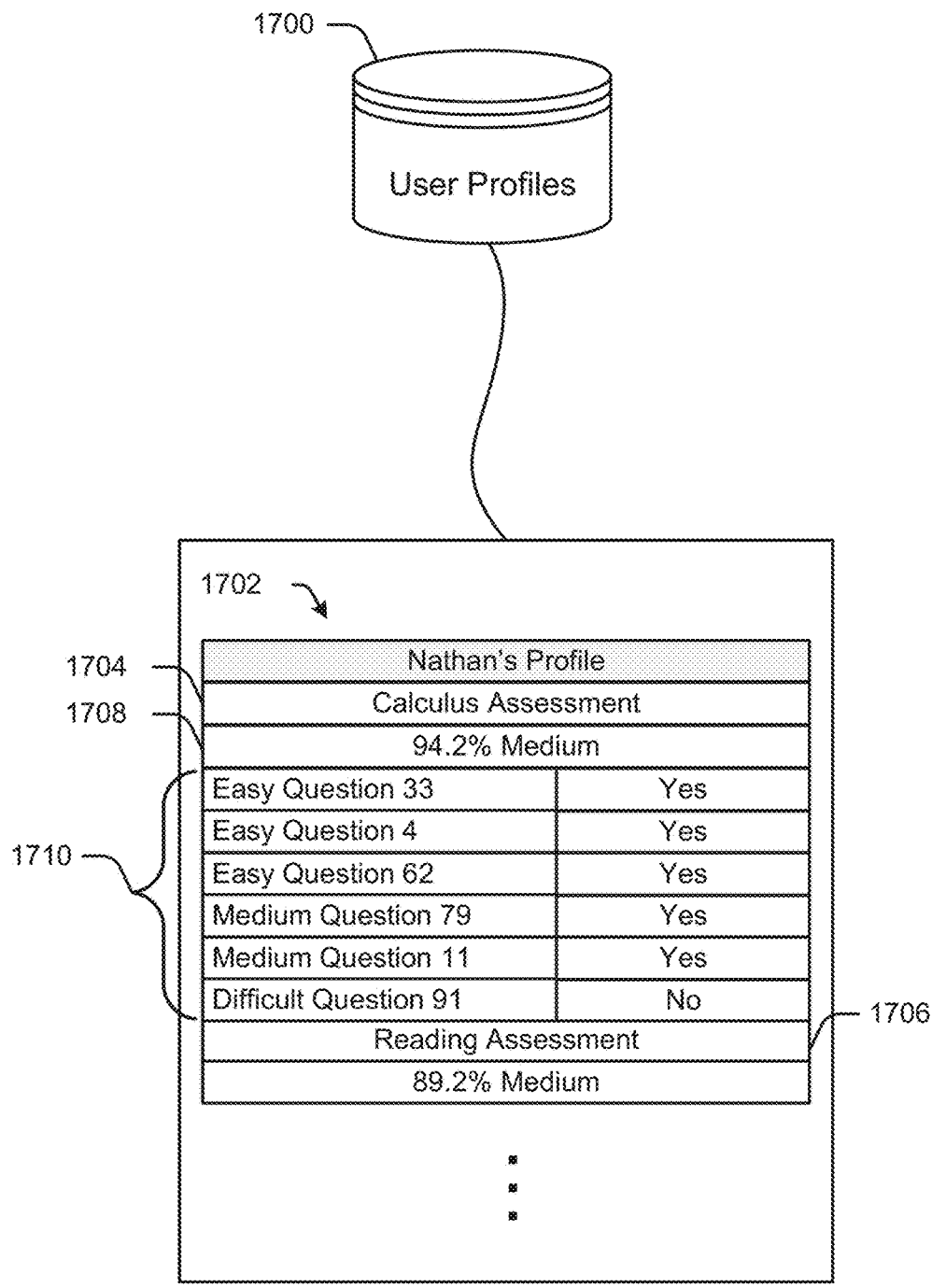
FIG. 17 illustrates an example of context information associated with a user profile in accordance with one or more implementations.

Moving to the lower portion of FIG. 16, context-based test 1606 reflects an updated version of context-based test 1604, where the updates are based on the newly acquired context information associated with student user 1600. Here, context-based test 1606 includes two medium level questions (Question No. 79 and Question No. 11) and one difficult question (Question No. 91). In turn, student user 1600 answers the medium level questions correctly, but fails to answer the difficult question correctly. This provides additional context information associated with student user 1600 to the context-based testing system that then can be used to select test information for subsequent tests in the same topic/sub-topic. For example, the context-based testing system can increase the number of difficult test questions in additional tests as the student user answers more difficult test questions correctly and the learning level associated with the student user changes (e.g., increases). If the student user continues to fail the difficult test questions correctly, this context information indicates the learning level associated with the user has decreased and to administer questions and/or additional learning material directed to the changed learning level. For example, the questions administered in context-based test 1604 and/or context-based test 1606 can have different levels of explanation based upon the learning level of the student user and/or the learning level of the question being administered. Questions categorized as easy questions may include less explanation than questions categorized as difficult questions since the student user has measured success with easy questions and less measured success with difficult questions. While described in the context of a single student user, alternate or additional implementations can group student users and generate context-based test information using context information associated with the group By collecting context information about a particular student user (and/or a group of student users), the context-based system can target relevant content to the student user, such as questions categorized to a particular learning level and/or questions with a particular explanation level. FIG. 17 illustrates an example user profile that stores example context information in accordance with one or more implementations. In various scenarios, the example described with respect to FIG. 17 can be considered a continuation of one or more examples described with respect to FIGS. 1-16.

FIG. 17 includes database 1700 that corresponds to storage for user profiles and/or context information associated with a user profile. In various implementations, database 1700 is representative of databases 118 of FIG. 1. Here, database 1700 includes user profile 1702 that includes context-information associated with student user 1600 of FIG. 16. User profile 1702 includes multiple sub-sections, each of which pertain to a particular topic. For example, sub-section 1704 corresponds to context-information pertaining to the sub-topic "Calculus", while sub-section 1706 corresponds to context-information pertaining to the sub-topic "Reading". Sub-section 1704 includes learning level assessment 1708 that represents a metric which describes the associated student user's learning level for that sub-topic. Here, the metric corresponds to a percentage of medium learning level questions answered correctly, but other types of metrics can be utilized without departing from the scope of the claimed subject matter. Various implementations use the metric to dynamically determine what test information to administer to the associated student user (e.g., learning level, explanation level). For example, since learning level assessment 1708 indicates a majority of medium learning level questions have been answered correctly, the context-based testing system concludes to administer more difficult questions to the student user. This determination can be made in any suitable manner, such as through the use of one or more predetermined thresholds, where the metric is compared to a first threshold that indicates whether to administer a mix of easy and medium questions, a second threshold that indicates whether to administer all medium questions, a third threshold that indicates whether to administer a mix of medium and difficult questions, and so forth. User profile 1702 also includes questions history 1710 that provides detailed information on what questions the student user has answered, whether the student user answered a particular question correctly, and so forth. This can be used to select test information that challenges the student user and/or re-tests the student user in weaker or less successful topics.

User context information provides the context-based testing system with an ability to administer content based on the learning level of a particular student user (and/or group of student users). This can include dynamically increasing or decreasing the difficulty level of the questions included in the test for a particular topic and/or sub-topic. In various implementations, the context-based testing system can provide study material based upon the learning level of the student user as well. To further demonstrate, consider now FIG. 18 that illustrates an example of providing adaptive learning material in accordance with one or more implementations. In various scenarios, the example described with respect to FIG. 18 can be considered a continuation of one or more examples described with respect to FIGS. 1-17.

Figure 18:
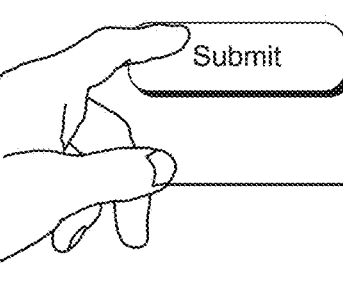
FIG. 18 illustrates an example of learning material adapted to an identified learning level in accordance with one or more implementations.

FIG. 18 illustrates an example progression of events over an arbitrary time period. Here, the progression begins in the upper portion of FIG. 18 and then moves to the lower portion of FIG. 18. It is to be appreciated that the progression of events described with respect to FIG. 18 is for discussion purposes, and that any other ordering, omission, and/or addition to the events can occur without departing from the scope of the claimed subject matter.

The upper portion of FIG. 18 includes user interface 1800 that presents testing information in the form of question 1802 and multiple-choice answers 1804. In this example, user 1806 has selected one of the multiple-choice answers as a response to question 1802 and is in process of submitting the response to the context-based testing system. In response to the submission, various implementations provide adaptive learning material to the user based upon an assessed learning level associated with the user. The adaptive learning material can either be dynamically generated and/or retrieved from stored content.

The lower portion of FIG. 18 includes two example user interfaces that presented adaptive learning material to the user. For instance, user interface 1808 represents a user interface that provides learning material directed towards a user to has an assessed learning level and/or comprehension level that corresponds to a low rating. In other words, for the particular subject matter associated with question 1802, the user has less proficiency and/or less successful answer rate relative to other students. This assessment can be achieved in any suitable manner, such as through tracking and/or monitoring historical answers provided by the user, generating a statistic on the monitored answers, and/or comparing the statistic to a predetermined threshold, comparing the statistic to other users, etc. In response to the context-based testing system determining that user 1806 has a low learning level associated with the subject matter included in question 1802, learning material 1810 includes more than the correct answer, it includes additional explanation on how the correct answer is achieved. Thus, relative to learning material associated with a medium learning level and/or high learning level, learning material 1810 includes additional subject matter.

To further illustrate, now consider user interface 1812 includes learning material associated with a high and/or medium learning levels. Here, learning material 1814 indicates the correct answer, but lacks the additional explanation included in learning material 1810. Accordingly, various implementations can dynamically adapt the amount of learning material presented to a student user based upon a corresponding learning level. Thus, as a student user learns new material, more comprehensive learning material is presented, and as the student user's learning level increases, the learning material provided to the student user can dynamically change. In other words, as the learning level associated with the student user changes, the learning material presented to the student user changes as well.

As further described herein, the context-based testing system collects context information about users, such as comprehension levels, and dynamically adapts the test material presented to the users based upon the context information, such as test questions and/or learning material. However, some implementations alternately or additionally gather content information the test information itself. In turn, this helps the context-based testing system evaluate and quantify where the provided test information has been properly categorized into the appropriate the learning level.

Figure 19:
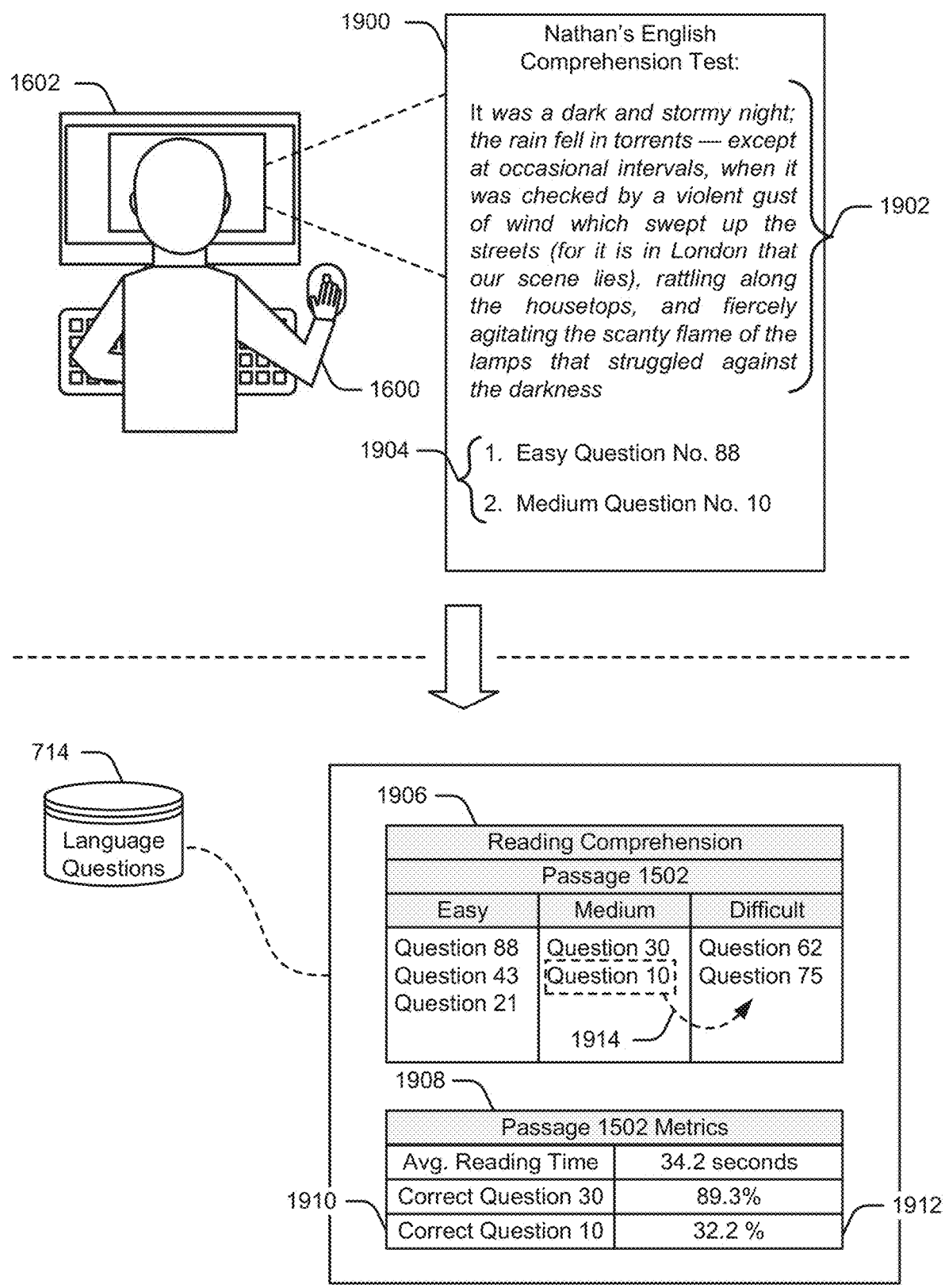
FIG. 19 illustrates an example of re-categorizing test information based on context information in accordance with one or more implementations.

To further demonstrate, consider now FIG. 19 that illustrates an example of quantifying the learning level of test information in accordance with one or more implementations. In various scenarios, the example described with respect to FIG. 19 can be considered a continuation of one or more examples described with respect to FIGS. 1-18. FIG. 19 illustrates an example progression of events over an arbitrary time period. Here, the progression begins in the upper portion of FIG. 19 and then moves to the lower portion of FIG. 19. It is to be appreciated that the progression of events described with respect to FIG. 19 is for discussion purposes, and that any other ordering, omission, and/or addition to the events can occur without departing from the scope of the claimed subject matter.

In the upper portion of FIG. 19, student user 1600 of FIG. 16 interacts with the context-based testing system via computing device 1602, such as by taking a quiz, a test, and so forth. Here, context-based test 1900 includes test information corresponding to English comprehension. Accordingly, context-based test 1900 includes passage 1902 and corresponding questions 1904. As further described herein, various implementations gather context information associated with student user 1600, as well as the topic/sub-topic being administered, to determine what test information to include in context-based test 1900. Alternately or additionally, various implementations gather context information about the test information being provided to the student user. In turn, the context information associated with the test information can be used to quantify a testing level associated with the test information To further demonstrate, the lower portion of FIG. 19 includes database 714 of FIG. 7 that stores various types of test information associated with language (e.g., English in this example). Accordingly, table 1906 corresponds to a reading comprehension sub-topic of the language topic and additionally includes multiple questions of varying testing levels. More particularly, table 1906 corresponds to passage 1902 and groups the associated questions with that passage. Thus, various implementations can identify and group questions that pertain to a same passage and/or topic. In this example, table 1906 identifies three easy questions, two medium questions, and two difficult questions that correspond to passage 1902.

Database 714 also includes table 1908 that corresponds to context information and/or metrics about passage 1902 and/or the questions associated with passage 1902 that have been gathered from various student users. For example, table 1908 includes an average reading time that represents the average time it takes multiple student users to read passage 1902. This can be determined in any suitable manner, such as by measuring the time between when the passage is first presented visually to when a first answer corresponding to the passage is received. Table also includes metrics about each question associated with the passage. For example, entry 1910 corresponds to question 10 and has an associated metric 1912. Here, the metric indicates that a question 10 is answered correctly on average 32.2% of the time. Various implementations use this metric and/or other metrics to quantify the testing level associated with a particular question. For example, question 30 has a same learning level categorization as question 10 and has an 89.3% successful answer rate. Based on these questions being categorized in the same grouping, various implementations determine that question 10 has been categorized into an inappropriate learning level. As another example, if most users answering question 10 have a high percentage of correct answers for other questions grouped in the same testing level, this indicates to the context-based testing system that question 10 has been categorized into an inappropriate learning level. Accordingly, the system moves and/or re-categorizes question 10 from a medium learning level to a difficult learning level, which is visually indicated here by arrow 1914. While this metric indicates a percentage of correct answers, other types of metrics can be utilized as well, such as an average amount of time spent answering a particular question, a similarity of student users answering the question, and so forth. Thus, the context-based testing the system monitors the categorization of test information by evaluating how various students interact with the test information.

Categorizing questions based on topic, sub-topic, and/or learning level can also be used to prevent copying answers and/or fraud by test takers. To further demonstrate, consider now FIG. 20 that illustrates an example of alternate test presentation in accordance with one or more implementations. In various scenarios, the example described with respect to FIG. 20 can be considered a continuation of one or more examples described with respect to FIGS. 1-19.

Figure 20:
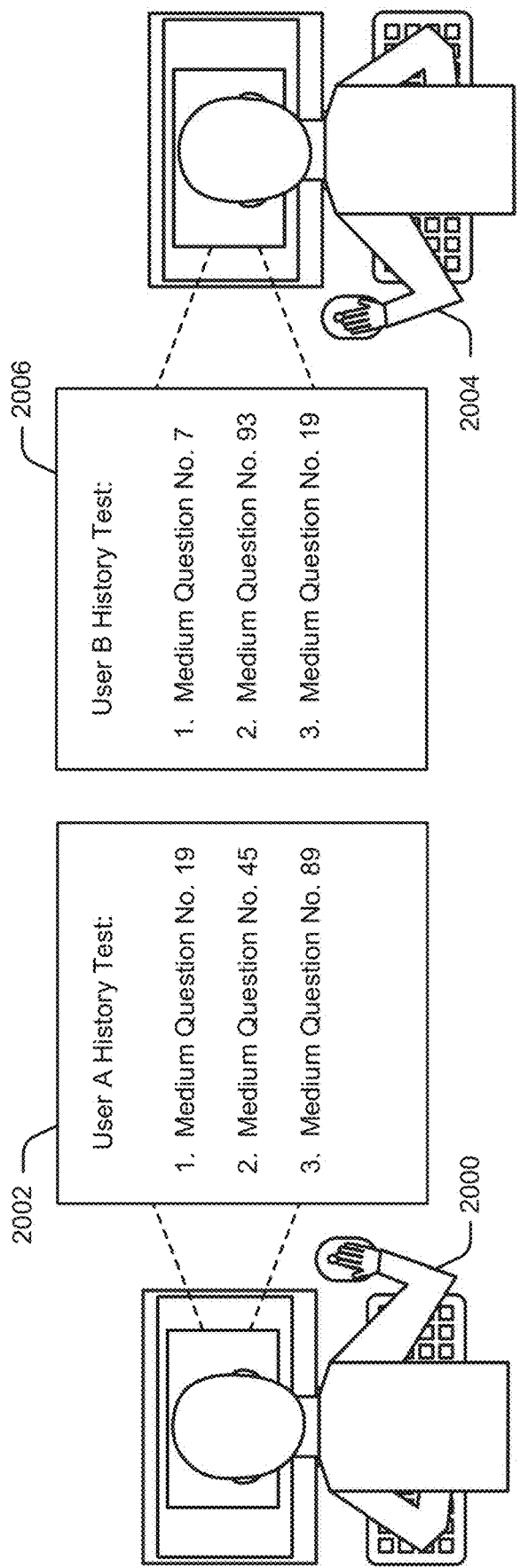
FIG. 20 illustrates an example of fraud prevention techniques in accordance with one or more implementations.

In FIG. 20, student user 2000 is in process of taking context-based test 2002, while student user 2004 is in process of taking context-based test 2006. Each context-based test corresponds to the same topic/sub-topic, which in this example is history. Further, each student user of FIG. 20 has a similar profile corresponding to the topic/sub-topic. In other words, student user 2000 has been assessed to have a same learning level in history that is the same and/or similar to that of student user 2004. Accordingly, various implementations of the context-based testing system administer questions at a same learning level to student user 2000 and student user 2004. As further described herein, the questions administered can either be obtained from static content and/or can be dynamically generated.

In this example, the learning assessment of student user 2000 matches or is within a predetermined amount of the learning assessment level of student user 2004 such that the context-based testing system provides test information of a same level to each user. In various implementations, the context-based testing system auto-generates different tests and/or questions for a same difficulty level. Alternately or additionally, the context-based testing system changes the sequence of the questions presented. In FIG. 20, context-based test 2002 includes three questions of medium learning level: Question No. 19 presented as the first in the sequence, Question No. 45 presented as the second in the sequence, and Question No. 89 presented as the third in the sequence. Similarly, context-based test 2006 includes questions having a medium learning level, but the context-based testing system has reordered the sequencing of the questions, as well as altered what questions are included. For example, context-based test 2002 lists Question No. 19 first in the sequence, but context-based test 2006 positions Question No. 19 third in the sequence. Further, context-based test 2006 has replaced Question No. 45 and Question No. 89 with Question No. 7 and Question No. 93. Thus, various implementations can auto-generate tests with different test questions and/or different sequencings as a way to prevent copying and/or fraud. While described in the context of reordering the positioning of questions that are administered, alternate or additional implementations reorder the positioning of answers provided for multiple-choice responses. For example, the multiple-choice answers provided to student user 2000 with an "A, B, C, D" ordering can be reordered for student user 2004 as "D, B, A, C". Alternately or additionally the context-based system can provide different possible answer choices to each user.

The context-based test system can also determine when questions are answered randomly. To demonstrate, consider now FIG. 21 that illustrates an example of determining random answers in accordance with one or more implementations. In various scenarios, the example described with respect to FIG. 21 can be considered a continuation of one or more examples described with respect to FIGS. 1-20.

Figure 21:
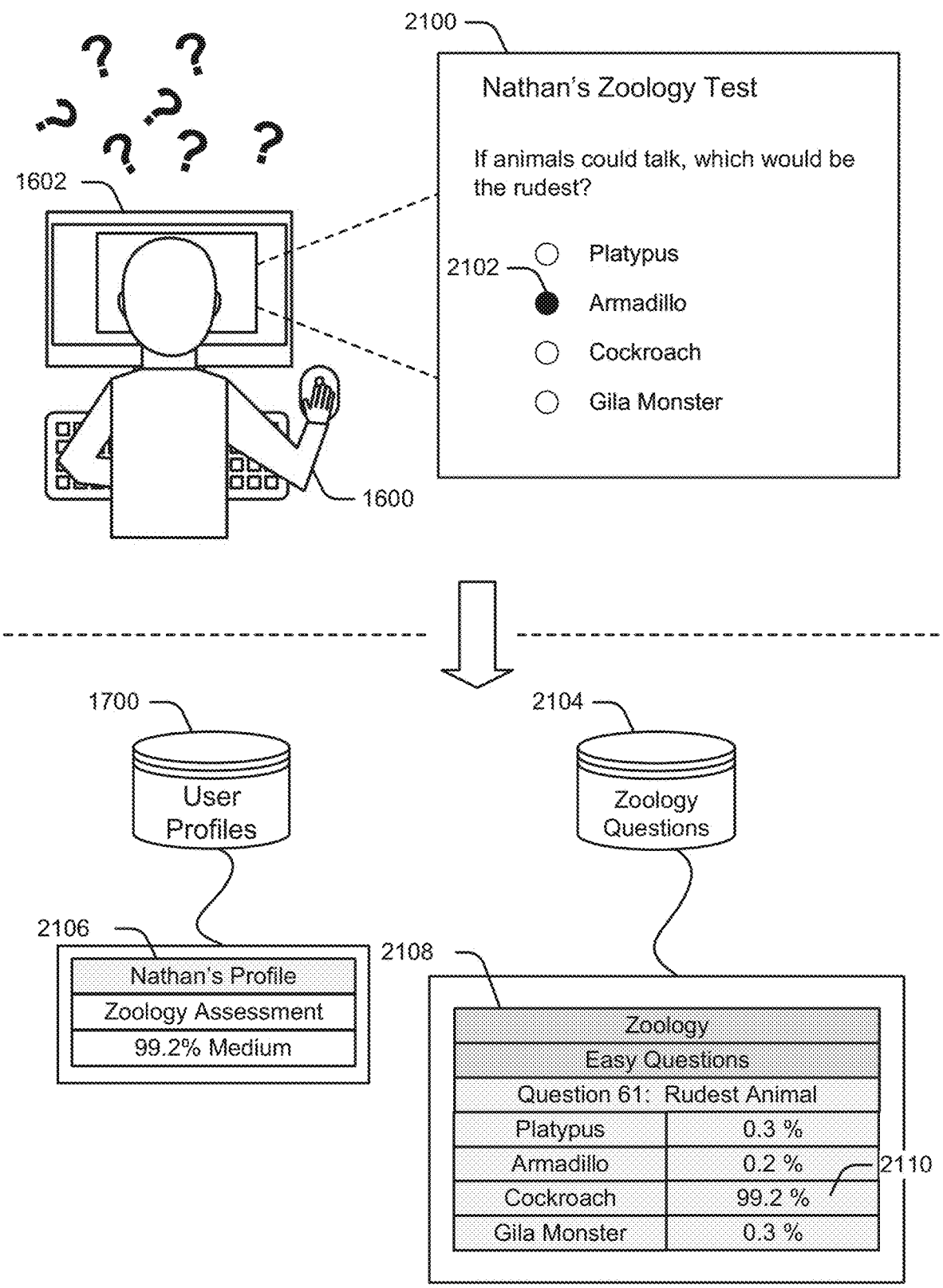
FIG. 21 illustrates an example of identifying a random answer in accordance with one or more implementations.

FIG. 21 illustrates an example progression of events over an arbitrary time period. Here, the progression begins in the upper portion of FIG. 21 and then moves to the lower portion of FIG. 21. It is to be appreciated that the progression of events described with respect to FIG. 21 is for discussion purposes, and that any other ordering, omission, and/or addition to the events can occur without departing from the scope of the claimed subject matter.

In the upper portion of FIG. 21, student user 1600 of FIG. 16 accesses computing device 1602 to take context-based test 2100. Here, student user 1600 lacks the appropriate knowledge to answer the proposed question. Accordingly, student user 1600 enters a random answer 2102 into the system. Various implementations use statistical analysis to identify when the user selects an answer choice at random.

To further demonstrate, consider now the lower portion of FIG. 21 that includes database 1700 of FIG. 17 that is associated with user profile and/or context information, and database 2104 that stores test information associated with a particular topic/sub-topic. In this example, the selected topic corresponds to zoology. By analyzing profile 2106, the context-based testing system identifies that student user 1600 has an assessed learning level of 99.2% in the selected topic, which corresponds to a medium difficulty learning level. Conversely, by consulting table 2108, the context-based testing system determines that the test information administered in context-based test 2100 has an easy learning level categorization. Further, the administered test information has a statistically-learned answer 2110 that differs from answer 2102 provided by the user. In various implementations, the context-based testing system identifies a random answer has been given by student user 1600 based on historical information about the user and/or the learning level of the administered test information. For example, some implementations identify that the standard deviation for answer 2102 differs from other questions answered by student user 1600 in the past. Alternately or additionally, various implementations measure the amount of time student user 1600 spent answering the question and determine from the time duration of the response that the user was unsure. For example, the profile information can indicate a standard/average amount of time student user 1600 spends on answering questions correctly, and then determined that the measured time duration deviates from the standard amount.

Various implementations alternately or additionally provide group rankings and/or analytics using context information and/or context-based testing. To further demonstrate, consider now FIG. 22 that illustrates an example of grouping student users in accordance with one or more implementations. In various scenarios, the example described with respect to FIG. 22 can be considered a continuation of one or more examples described with respect to FIGS. 1-21.

Figure 22:
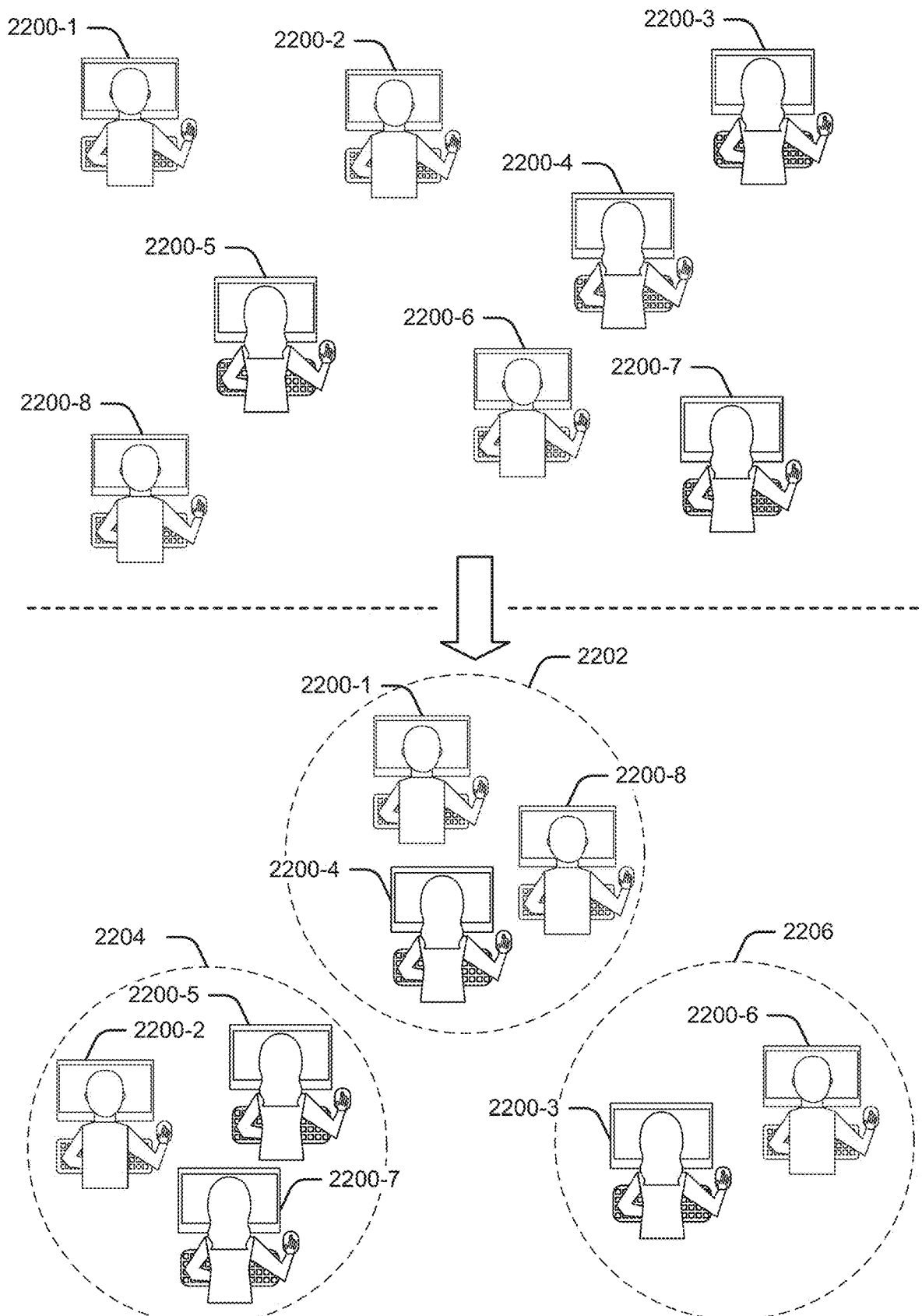
FIG. 22 illustrates an example of grouping various student users in accordance with one or more implementations.

FIG. 22 illustrates an example progression of events over an arbitrary time period. Here, the progression begins in the upper portion of FIG. 22 and then moves to the lower portion of FIG. 22. It is to be appreciated that the progression of events described with respect to FIG. 22 is for discussion purposes, and that any other ordering, omission, and/or addition to the events can occur without departing from the scope of the claimed subject matter.

The upper portion of FIG. 22 includes multiple student users, identified here as student user 2200-1 through student user 2200-8 respectively. While the example described here is discussed in the context of including eight respective student users, it is to be appreciated that any number of student users can be analyzed and grouped without departing from the scope of the claimed subject matter. In the upper portion of FIG. 21, each respective student user is in the process of taking a respective context-based test. Each respective context-based test can be associated with a distinct subject matter, such that each respective student user is taking a test on a different subject matter or can be associated with the same subject matter. In various implementations, some of the respective context-based tests are associated with the same subject matter, while other respective context-based tests are associated with unrelated subject matters. Thus, the context-based tests administered to student users 2200-1 through 2200-8 can include any combination of related or unrelated subject matter.

Since each respective student user is taking a context-based test, the test information is managed by the context-based testing system. Accordingly, various questions presented to each respective student user has a corresponding personality and/or characteristic that enables the context-based testing system to acquire additional context information about the respective student user as further described herein. This can include learning level difficulty, associated topic, associated sub-topic, and so forth. Alternately or additionally, the characteristics and/or personalities associated with the test information can be used to extract test information origination information (e.g., which publisher submitted the test information), student user interests (e.g., preferred subject matters, hobbies, preferred restaurants), associated student user schools, associated student user geography, associated student user age, and so forth. Thus, various implementations use context information to group various student users and provide group statistics and/or analytics associated with the group members.

Moving to the lower portion of FIG. 22, the context-based testing system has created three distinct groups: group 2202, group 2204, and group 2206. Each group includes student users that have been identified as having one or more characteristics in common. For example, group 2202 includes student user 2200-1, student user 2200-4, and student user 2200-8. Group 2204 includes student user 2200-2, student user 2200-5, and student user 2200-7. Finally, group 2206 includes student users 2200-3 and 2200-6. Various implementations use these groupings to evaluate the student users through user interactions with various context-based tests and provides statistical and/or analytical information about the group and/or individual student users in the group.

Figure 23:
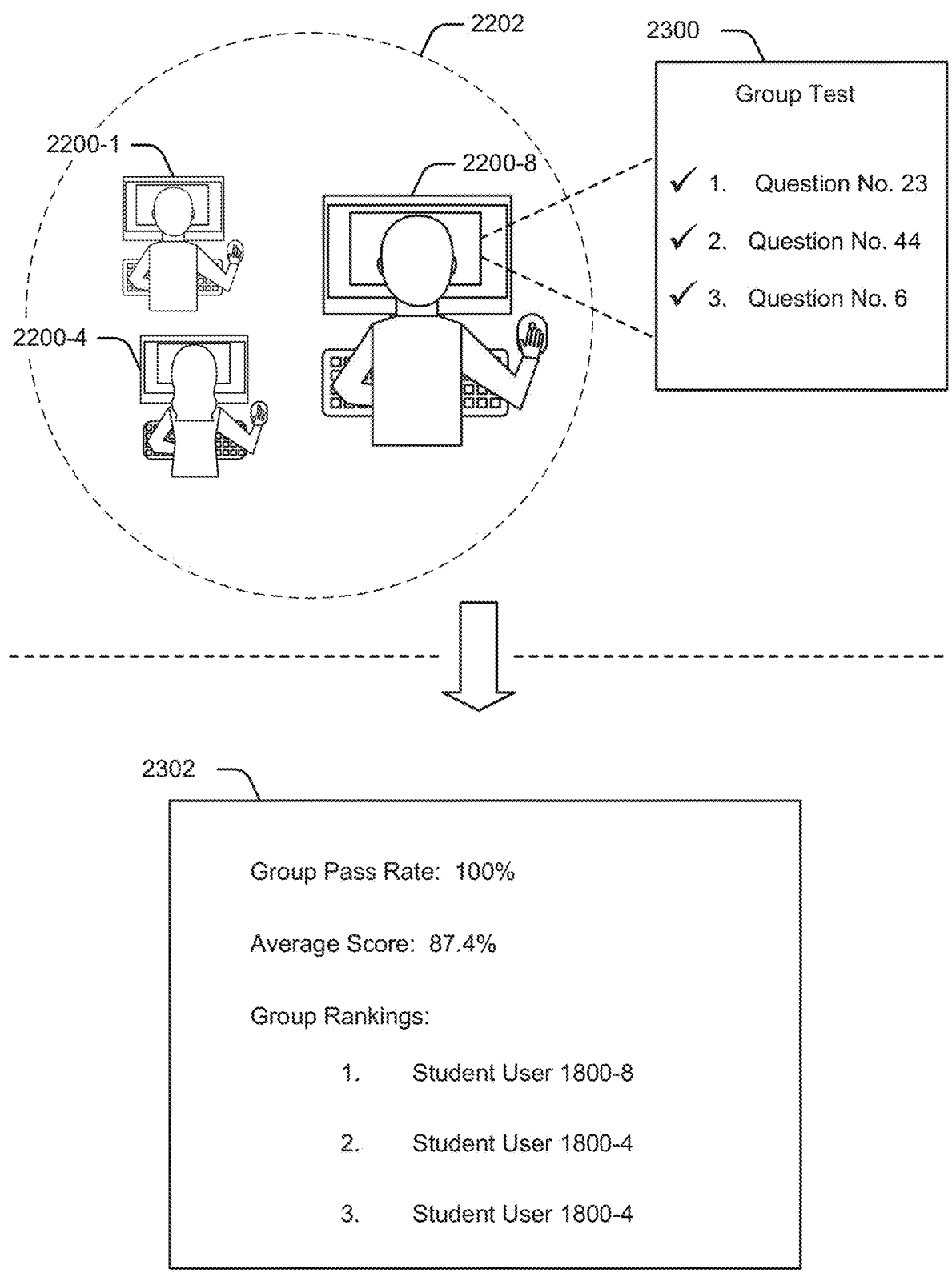
FIG. 23 illustrates an example of generating statistical data based on a group of student users in accordance with one or more implementations.

To further demonstrate, consider now FIG. 23 that illustrates an example of group and individual rankings in accordance with one or more implementations. In various scenarios, the example described with respect to FIG. 23 can be considered a continuation of one or more examples described with respect to FIGS. 1-22.

FIG. 23 illustrates an example progression of events over an arbitrary time period. Here, the progression begins in the upper portion of FIG. 23 and then moves to the lower portion of FIG. 23. It is to be appreciated that the progression of events described with respect to FIG. 23 is for discussion purposes, and that any other ordering, omission, and/or addition to the events can occur without departing from the scope of the claimed subject matter.

In the upper portion of FIG. 23, the context-based testing system administers context-based tests to each respective student user in group 2202 of FIG. 22. Any suitable type of context-based test can be administered, where each respective student user is administered a same subject matter test and/or each respective student user is given a different test. Since each test originates from the context-based system, the system can customize the tests based on individual student users and/or the collective group of student users included in group 2202. Here, context-based test 2300 represents a test being administered to student user 2200-8 of FIG. 22, where each question has been answered correctly. Various implementations collect these user interactions (e.g., the user interactions of each student user included in group 2202) and then analyze the interactions to provide statistics for the group. For example, the context-based test system can track individual as well as group scores for various context-based tests administered to the student users, calculate relative skills of each student user in the group, and provide a rating based on the relative skills.

Moving to the lower portion of FIG. 23, analysis 2302 provides various types of ranking and/or group statistics based upon the information tracked by the context-based testing system. To illustrate, analysis 2302 includes a group pass rate for the administered test, the average score received across the group, and individual rankings of each student user relative to other student users. While analysis 2302 includes statistical information based upon the test corresponding to context-based test 2300, it is to be appreciated that other implementations provide statistical information generated from multiple types of tests, including tests that span multiple different topics, sub-topics, etc. Alternately or additionally, the analysis can rank groups against one another, such as by providing a relative ranking of group 2202 with respect to group 2204 and group 2206 of FIG. 22. Accordingly, some implementations generate group rankings that update as additional context information and/or user interactions are collected.

As further described herein, the context-based testing system analyzes and/or monitors test information to categorize the test information accordingly. For instance, the example described with respect to FIG. 19 re-categorizes a particular question from a medium learning level to a difficult learning level based upon user profile information, question metrics, and so forth. Various implementations alternately or additionally re-group student users based upon their interactions with the context-based testing system. To further demonstrate, consider now FIG. 24 that illustrates an example of re-grouping a student user in accordance with one or more implementations. In various scenarios, the example described with respect to FIG. 24 can be considered a continuation of one or more examples described with respect to FIGS. 1-23.

Figure 24:
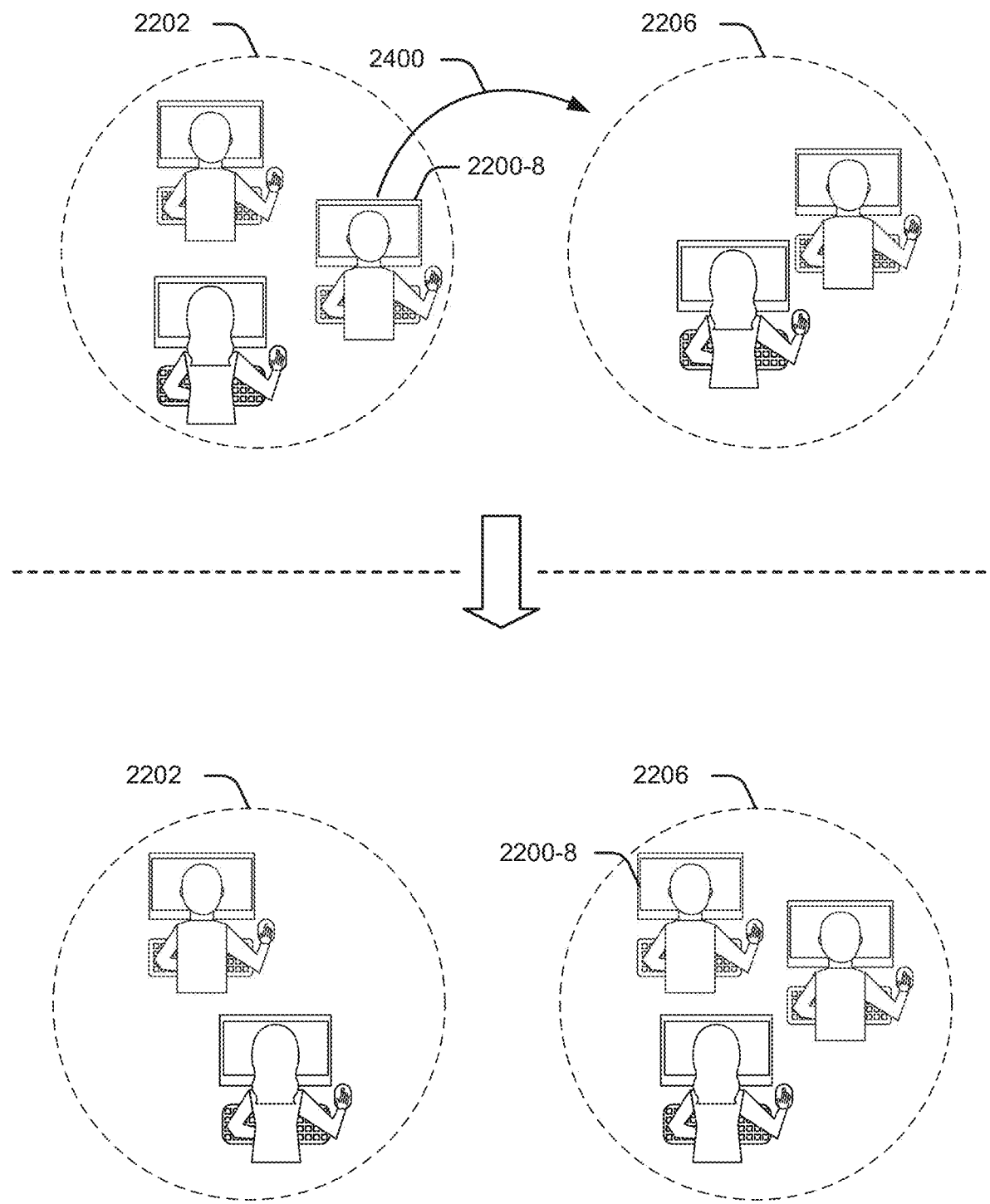
FIG. 24 illustrates an example of re-grouping student users in accordance with one or more implementations.

FIG. 24 illustrates an example progression of events over an arbitrary time period. Here, the progression begins in the upper portion of FIG. 24 and then moves to the lower portion of FIG. 24. It is to be appreciated that the progression of events described with respect to FIG. 24 is for discussion purposes, and that any other ordering, omission, and/or addition to the events can occur without departing from the scope of the claimed subject matter.

The upper portion of FIG. 24 includes group 2202 and group 2206 of FIG. 22. Recall from other discussions provided herein that the context-based testing system collects and analyzes context information, such as student user context information, question context information, group context information, and so forth. Recall, too, that various implementations generate student user rankings and/or group rankings. These rankings can be used by the context-based testing system to re-group a student user from one group to another group. For instance, in the example described with respect to FIG. 23, student user 2200-8 receives the top ranking relative to the other student users in group 2202 for context-based test 2300. While analysis 2302 corresponds to the context-based test 2300, the results from this test can be combined in with other results such that student user 2200-8 has an individual ranking that exceeds a threshold associated with group 2202 and/or aligns better with one or more rankings associated with group 2206. Alternately or additionally, the test information answered by student user 2200-8 can generate new context information that identifies additional characteristics and/or personality traits that align student user 2200-8 better with group 2206 relative to group 2202. Accordingly, in this example, the context-based testing system determines to re-group student user 2200-8 from group 2202 to group 2206. This is further indicated visually through the use of arrow 2400.

Moving to the lower portion of FIG. 24, student user 2200-8 has been re-grouped into group 2206. In various implementations, the statistical analysis and/or context information associated with student user 2200-8 is also moved from group 2202 to group 2206 such that the corresponding data associated with the re-grouped student user no longer affects group statistics associated with group 2202. Alternately or additionally, the corresponding data associated with the re-grouped student user is incorporated into the group statistics associated with group 2206.

Figure 25:
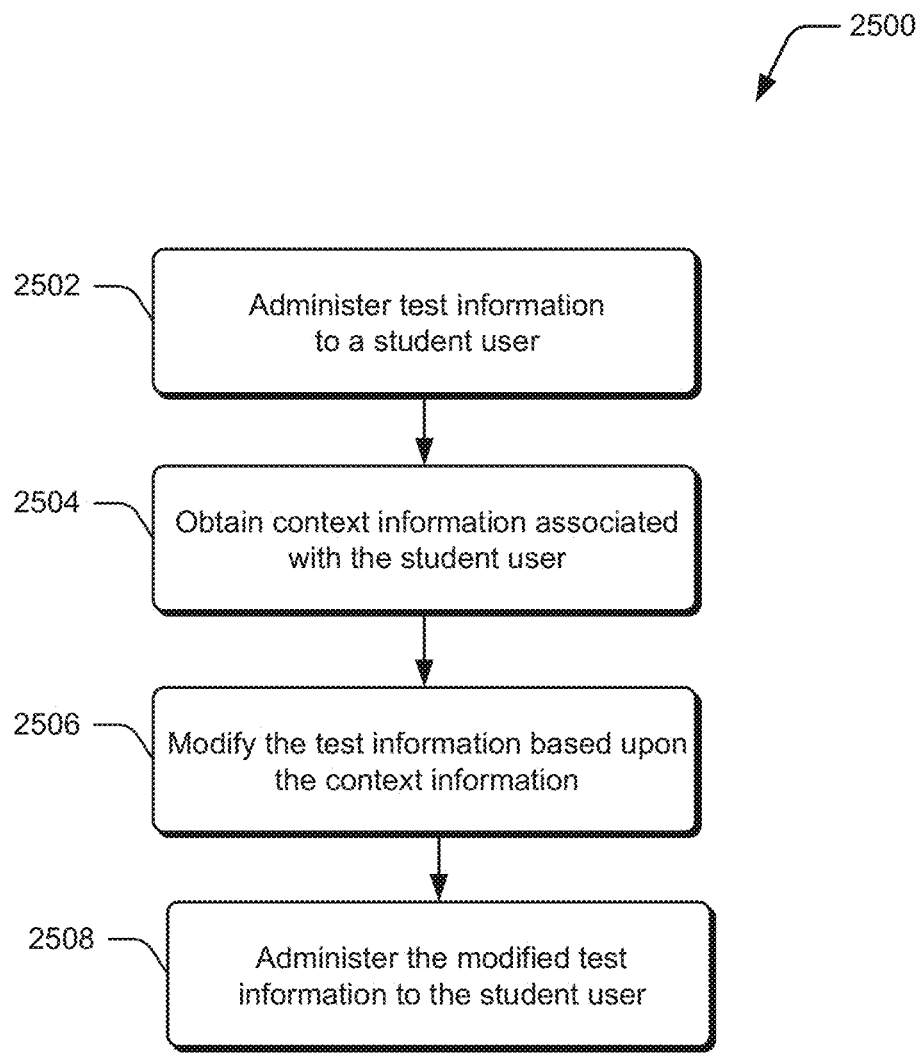
FIG. 25 illustrates a flow diagram that modifies test information to a student user based on context information in accordance with one or more implementations.

FIG. 25 illustrates an example method 2500 that dynamically modifies the test information administered to a student user. The method can be performed by any suitable combination of hardware, software, and/or firmware. In at least some embodiments, aspects of the method can be implemented by one or more suitably configured hardware components and/or software modules, such as server testing module 108, publishing module 124, and/or client testing module 128 of FIG. 1. These modules can reside on separate computing devices and/or be integrated onto a single device as further described herein. While the method described in FIG. 25 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2502, various implementations administer test information to a student user. Any type of test information can be administered, such as dynamically generated test information, static test information, or any combination thereof. The student user can be grouped together with other student users and/or can be a stand-alone student user without any associations to other student users. The test information can be administered in any suitable manner, such as via a mobile phone, a desktop computing device, audibly, and so forth. In administering the test information, various implementations dynamically generate test information, such as questions and/or learning material, based upon a learning level associated with the student user. Thus, some implementations identify a learning level associated with the student user and select questions based upon the learning level. In some scenarios, administering the test information includes providing learning material based upon the identified learning level as further described herein.

At 2504, one or more implementations obtain context information associated with the student user. As one example, the context information can indicate a change in the learning level associated with the student user, such as an increase in the learning level and/or performance of the student user that indicates the student user understands the related material, a decrease in the learning level that indicates a lack of understanding, and so forth. When associated with a group of student users, the context information sometimes includes information that indicates the student user should be regrouped with other student users as further described herein.

In response to obtaining the context information, various implementations modify the test information based on the context information at 2506, such as by increasing the level of difficulty in the questions, decreasing the level of difficulty in the questions, obtaining test information associated with another group of student users, and so forth. In turn, and in response to modifying the test information, one or more implementations administer the modified test information to the student user at 2508.

Having described an example of providing adaptive test information, consider now a discussion of example devices in which can be used for various implementations.

Example Devices

Figure 26:
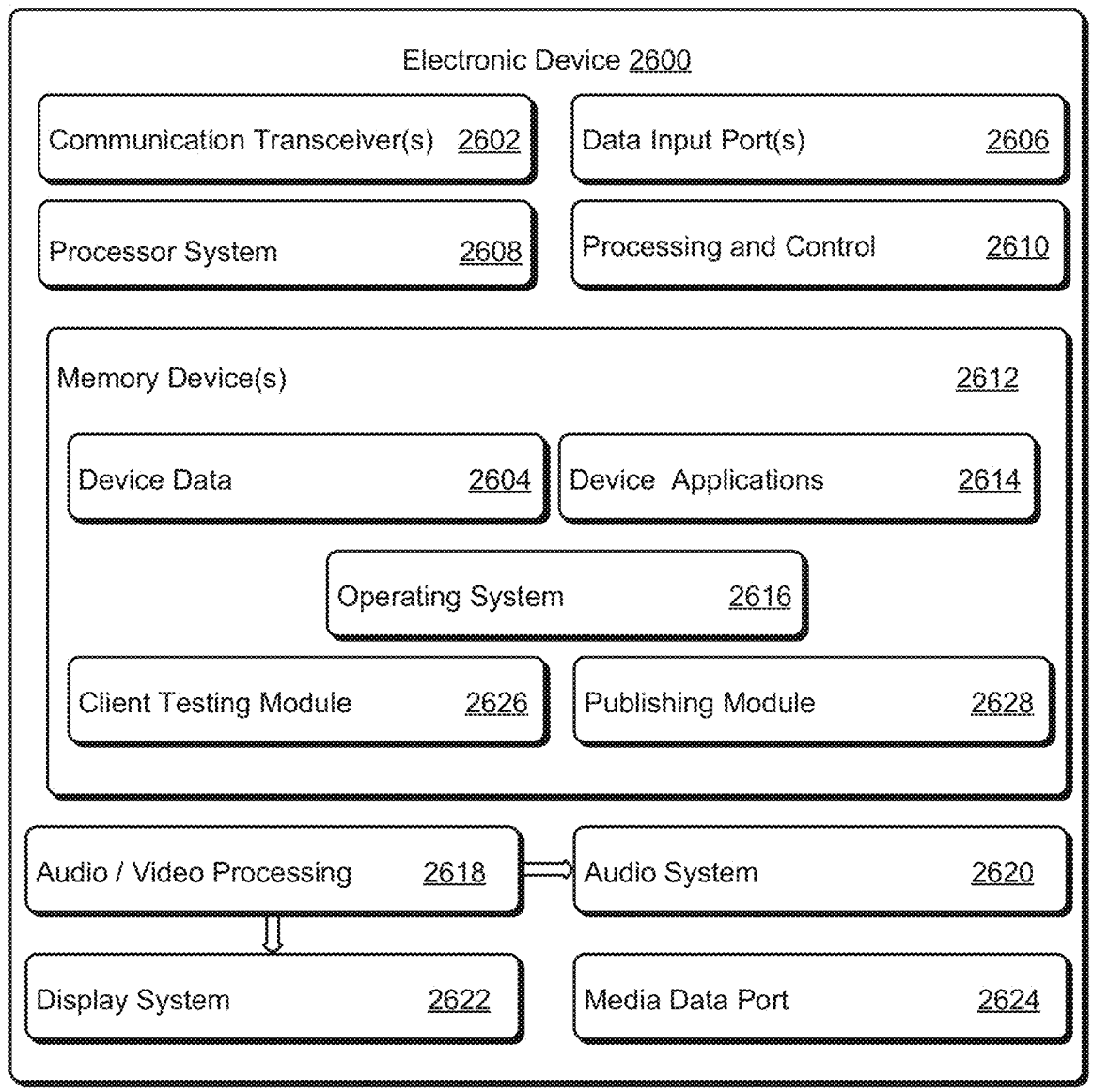
FIG. 26 is an illustration of an example computing device in accordance with one or more implementations.
Figure 27:
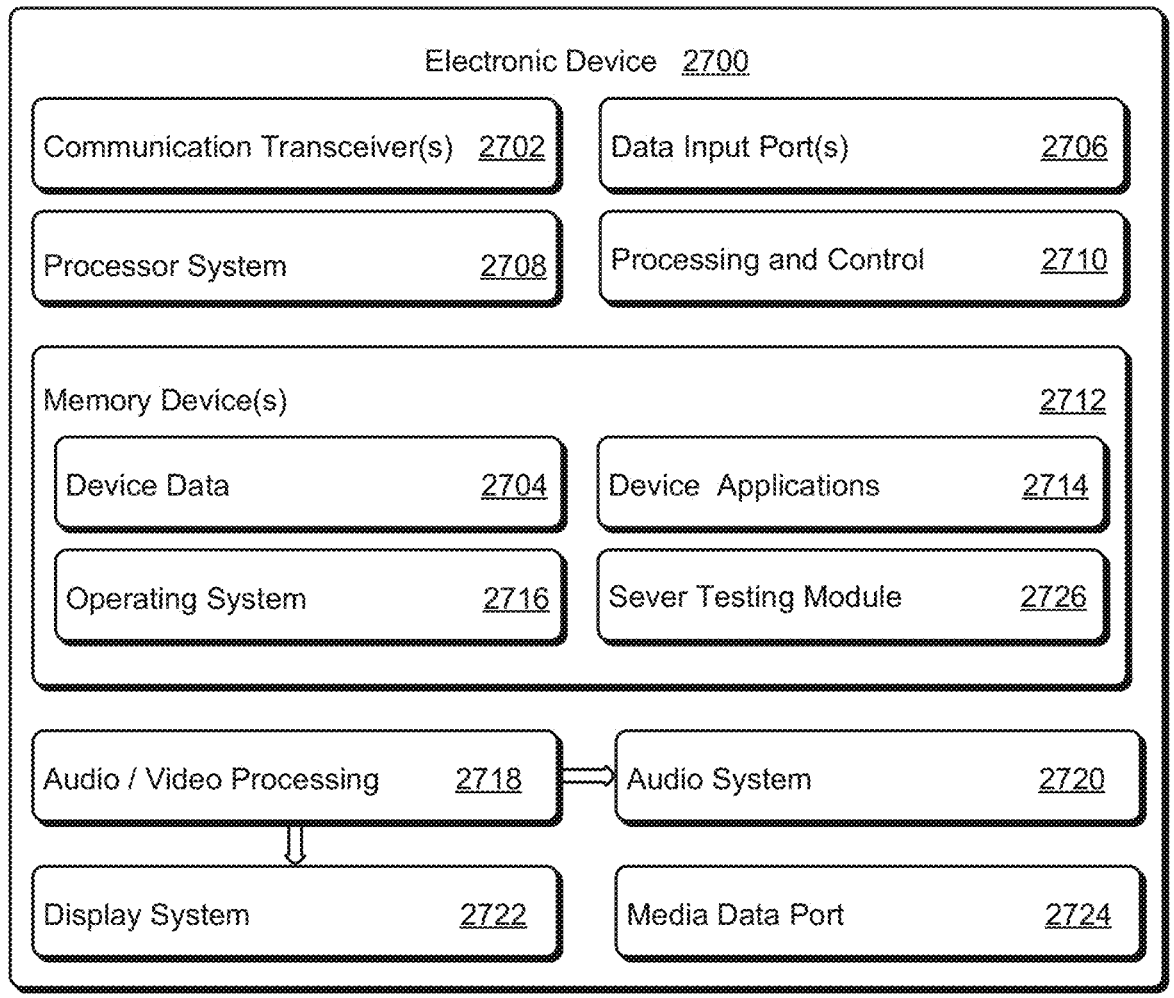
FIG. 27 is an illustration of an example server device in accordance with one or more implementations.

FIG. 26 illustrates various components of an example electronic device 2600, such as computing device 104 and/or computing device 106 of FIG. 1, while FIG. 27 illustrates various components of an example electronic device 2700, such as one of servers 102 of FIG. 1. Accordingly, electronic device 2600 and/or electronic device 2700 can be utilized to implement various aspects of intelligent context-based testing as further described herein. In some implementations, electronic device 2600 and electronic device 2700 have at least some similar components. Accordingly, for the purposes of brevity, FIGS. 26 and 27 will be described together. Similar components associated with FIG. 26 will be identified as components having a naming convention of "26XX", and components associated with FIG. 27 will be identified as components having a naming convention of "27XX". Conversely, components distinct to each device will be described separately and after the similar components.

Electronic device 2600/electronic device 2700 includes communication transceivers 2602/communication transceivers 2702 that enable wired or wireless communication of device data 2604/device data 2704, such as received data and transmitted data. While referred to as a transceiver, it is to be appreciated that communication transceivers 2602/communication transceivers 2702 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 2600/electronic device 2700 may also include one or more data input ports 2606/data input ports 2706 via which any type of data, media content, and inputs can be received, such as user-selectable inputs, messages, music, television content, recorded video content, and any other type of audio, video, or image data received from any content or data source. Data input ports 2606/data input ports 2706 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 2600/electronic device 2700 of this example includes processor system 2608/processor system 2708 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 2610/processing and control 2710. Although not shown, electronic device 2600/electronic device 2700 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 2600/electronic device 2700 also includes one or more memory devices 2612/memory devices 2712 that enable data storage, examples of which include random access memory (RAM), non-volatile memory (e.g., read-only memory (ROM), flash memory, EPROM, EEPROM, etc.), and a disk storage device. Memory devices 2612/memory devices 2712 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 2612/memory devices 2712 provide data storage mechanisms to store the device data 2604/device data 2704, other types of information or data, and/or various device applications 2614/device applications 2714 (e.g., software applications). For example, operating system 2616/operating system 2716 can be maintained as software instructions within memory devices 2612/memory devices 2712 and executed by processor system 2608/processor system 2708.

Electronic device 2600/electronic device 2700 optionally includes audio and video processing system 2618/audio and video processing system 2718 that processes audio data and passes through the audio and video data to optional audio system 2620/audio system 2720. Audio system 2620/audio system 2720 and optional display system 2622/display system 2722 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 2624/media data port 2724. In some implementations, optional audio system 2620/audio system 2720 and optional display system 2622/display system 2722 are external components to electronic device 2600/electronic device 2700. Alternatively, or additionally, optional audio system 2620/audio system 2720 and optional display system 2622/display system 2722 can be an integrated component of the example electronic device 2600/electronic device 2700, such as part of an integrated speaker and/or an integrated display and touch interface.

In some aspects, memory devices 2612 of electronic device 2600 includes client testing module 2626 and/or publishing module 2628 to provide various intelligent context-based testing features. When implemented as a student device, electronic device 2600 includes at least client testing module 2626. When implemented as a publishing device, electronic device 2600 can alternately or additionally include publishing module 2628. With respect to client testing module 2626, various implementations enable a student user to access test information, either over a communication network and/or through a stand-alone application. With respect to publishing module 2628, various implementations generate and/or parse input digital images to identify various types of test information, gather context information about a particular student user and/or a group of student users, select test information to administer based on the contest information, and so forth. While client testing module 2626 and publishing module 2628 are illustrated here as residing on memory devices 2612, alternate or additional implementations of these modules can in include software, firmware, hardware, or any combination thereof.

In some aspects, memory devices 2712 of electronic device 2700 includes server testing module 2726 to context-based testing in a uniform manner to multiple different devices. In various implementations, server testing module 2726 receives context information gathered by client testing module 2626 of electronic device 2600 and/or digital images collected by publishing module 2628, such as context information about a particular student user. In various implementations, the server testing module collects context information about a group of student users from multiple student devices to generate analytics as further described herein. Alternately or additionally, some implementations maintain a database that is subsequently used to adaptively select test information that is administered to a student user based on the contest information.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A computer-implemented method comprising:
    receiving an image of a document that includes content;
    processing, by at least one computing device, the image to extract original test information from the content, said processing including extracting structural data and contextual data from the document to generate the original test information, the structural data indicating a visual structure of the original test information, and the contextual information indicating a subject matter of the original test information;
    analyzing the original test information to determine characteristics associated with the original test information, the characteristics identifying the structural data and the contextual data;
    obtaining additional content based on the characteristics, said obtaining including searching a data source with the characteristics to obtain the additional content not included in the test information; and
    generating, by the at least one computing device, additional test information based on the extracted test information and the additional content, said generating including incorporating at least some of the additional content into the original test information to generate the additional test information as a modified version of the original test information.

2. The computer-implemented method as recited in claim 1, wherein the original test information comprises multiple questions and respective multiple-choice answers for each respective question of the multiple questions.

3. The computer-implemented method as recited in claim 1, wherein said obtaining the additional content comprises:
    searching the data source over a network for new content that includes the characteristics; and
    selecting the additional content from the new content that includes one or more of the characteristics.

4. The computer-implemented method as recited in claim 1, wherein said extracting the structural data comprises one or more of:
    identifying indentation blocks;
    identifying additional spacing between text groups; or
    identifying a numeric sequence.

5. The computer-implemented method as recited in claim 1, wherein said analyzing the original test information to determine the characteristics further comprises one or more of:
    identifying a topic or sub-topic associated with the original test information;
    identifying language content associated with the original test information; or
    identifying a math focus associated with the original test information.

6. The computer-implemented method as recited in claim 1, wherein said generating the additional test information further comprises generating one or more new questions for subject matter associated with the original test information.

7. The computer-implemented method as recited in claim 6, wherein said generating the one or more new questions further comprises:
    identifying a learning level associated with the original test information; and
    generating the one or more new questions based on the identified learning level.

8. The computer-implemented method as recited in claim 7, wherein said identifying the learning level further comprises:
    identifying a number of concepts included in the original test information; and
    determining the learning level based on the identified number of concepts.

9. The computer-implemented method as recited in claim 1 further comprising: identifying a statistically generated answer to the extracted original test information or the additional test information.

10. The computer-implemented method as recited in claim 1, wherein the visual structure of the original test information includes a visual image comprising at least some non-textual content, and wherein the additional content comprises a textual description of the non-textual content.

11. The computer-implemented method as recited in claim 1, wherein the visual structure of the original test information includes a visual image comprising at least some non-textual content, and wherein said generating the additional test information comprises:
  converting, by the at least one computing device, the non-textual content into a text-based description of the visual image; and
  generating, by the at least one computing device and using the test-based description, a machine-generated shape for the visual shape for inclusion as part of the additional test information.

12. A system comprising:
a processing system; and
computer-readable storage media storing instructions that are executable by the processing system to:
  receive an image of a document that includes content;
  process the image to extract original test information from the content including to extract structural data and contextual data from the document to generate the original test information, the structural data indicating a visual structure of the original test information, and the contextual information indicating a subject matter of the original test information;
  analyze the original test information to determine characteristics associated with the original test information, the characteristics identifying the structural data and the contextual data;
  obtain additional content based on the characteristics, including to search a data source with one or more of the characteristics to obtain the additional content not included in the test information; and
  generate additional test information based on the extracted test information and the additional content, including to incorporate at least some of the additional content into the original test information to generate the additional test information as a modified version of the original test information.

13. The system as recited in claim 12, wherein the visual structure of the original test information includes a visual image comprising at least some non-textual content, and wherein to obtain the additional content comprises to obtain a textual description of the non-textual content.

14. The system as recited in claim 12, wherein to extract structural data from the document comprises one or more of to:
  identify indentation blocks;
  identify additional spacing between text groups; or
  identify a numeric sequence.

15. The system as recited in claim 12, wherein to extract contextual data from the document comprises one or more of to:
  identify a topic or sub-topic associated with the original test information;
  identify language content associated with the original test information; or
  identify a math focus associated with the original test information.

16. The system as recited in claim 12, wherein to obtain additional content comprises to:
  search the data source over a network for new content that includes the characteristics; and
  select the additional content from the new content that includes the one or more characteristics.

17. One or more computer-readable storage media implemented at least in part in hardware and storing instructions that are executable by a computing system to perform operations comprising:
  receiving an image of a document that includes content;
  processing, by at least one computing device, the image to extract original test information from the content, said processing including extracting structural data and contextual data from the document to generate the original test information, the structural data indicating a visual structure of the original test information, and the contextual information indicating a subject matter of the original test information;
  analyzing the original test information to determine characteristics associated with the original test information, the characteristics identifying the structural data and the contextual data;
  obtaining additional content based on the characteristics, said obtaining including searching a data source with the characteristics to obtain the additional content not included in the test information; and
  generating, by the at least one computing device, additional test information based on the extracted test information and the additional content, said generating including incorporating at least some of the additional content into the original test information to generate the additional test information as a modified version of the original test information.

18. The one or more computer-readable storage media as described in claim 17, wherein said obtaining the additional content comprises:
  searching the data source over a network for new content that includes the characteristics; and
  selecting the additional content from the new content that includes one or more of the characteristics.

19. The one or more computer-readable storage media as described in claim 17, wherein said analyzing the original test information to determine the characteristics further comprises one or more of:
  identifying a topic or sub-topic associated with the original test information;
  identifying language content associated with the original test information; or
  identifying a math focus associated with the original test information.

20. The one or more computer-readable storage media as described in claim 17, wherein said generating the additional test information further comprises generating one or more new questions for subject matter associated with the original test information.

* * * * *